United States Patent
Hilmes et al.

(10) Patent No.: US 9,653,060 B1
(45) Date of Patent: May 16, 2017

(54) HYBRID REFERENCE SIGNAL FOR ACOUSTIC ECHO CANCELLATION

(71) Applicant: Amazon Technologies, Inc., Seattle, WA (US)

(72) Inventors: Philip Ryan Hilmes, San Jose, CA (US); Robert Ayrapetian, Morgan Hill, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/019,108

(22) Filed: Feb. 9, 2016

(51) Int. Cl.
| | |
|---|---|
| *G10K 11/00* | (2006.01) |
| *G10L 21/0272* | (2013.01) |
| *G10L 15/22* | (2006.01) |
| *G10L 21/0208* | (2013.01) |

(52) U.S. Cl.
CPC ........ *G10K 11/002* (2013.01); *G10L 21/0272* (2013.01); *G10K 2210/3012* (2013.01); *G10K 2210/3028* (2013.01); *G10K 2210/3044* (2013.01); *G10K 2210/3046* (2013.01); *G10K 2210/505* (2013.01); *G10K 2210/509* (2013.01); *G10L 2015/223* (2013.01); *G10L 2021/02082* (2013.01)

(58) Field of Classification Search
CPC ......... G10K 11/002; G10K 2210/3012; G10K 2210/3028; G10K 2210/3044; G10K 2210/3046; G10K 2210/505; G10K 2210/509; G10L 21/0272; G10L 2015/223
See application file for complete search history.

(56) References Cited

U.S. PATENT DOCUMENTS

| | | | | |
|---|---|---|---|---|
| 5,323,459 | A * | 6/1994 | Hirano | H04M 9/082 370/290 |
| 5,371,789 | A * | 12/1994 | Hirano | H04M 9/082 370/290 |
| 5,396,554 | A * | 3/1995 | Hirano | H04M 9/082 370/290 |
| 5,513,265 | A * | 4/1996 | Hirano | G10K 11/178 379/406.01 |
| 5,661,813 | A * | 8/1997 | Shimauchi | H04M 9/082 381/66 |
| 5,761,318 | A * | 6/1998 | Shimauchi | H04M 9/082 379/406.05 |
| 5,796,819 | A * | 8/1998 | Romesburg | H04M 9/082 370/291 |
| 5,856,970 | A * | 1/1999 | Gee | H04B 7/005 370/286 |
| 6,404,886 | B1 * | 6/2002 | Yoshida | H04M 9/082 379/406.01 |

(Continued)

*Primary Examiner* — Brenda Bernardi
(74) *Attorney, Agent, or Firm* — Pierce Atwood LLP

(57) ABSTRACT

An echo cancellation system that uses a combined reference signal using a playback reference signal and an adaptive reference signal. The playback reference signal is generated from a playback signal sent to a loudspeaker and the adaptive reference signal is generated using beamforming on microphone inputs corresponding to audio received from the loudspeaker. The system applies a low pass filter to the playback reference signal and applies a high pass filter to the adaptive reference signal to generate the combined reference signal. The system may remove the combined reference signal from target signals associated with the microphone inputs to isolate speech included in the target signals.

20 Claims, 14 Drawing Sheets

(56) References Cited

U.S. PATENT DOCUMENTS

| | | | | |
|---|---|---|---|---|
| 6,577,731 | B1* | 6/2003 | Sugiyama | H03H 21/0012 |
| | | | | 379/406.01 |
| 6,700,977 | B2* | 3/2004 | Sugiyama | H04M 9/082 |
| | | | | 379/406.01 |
| 7,443,989 | B2* | 10/2008 | Choi | G10L 21/0208 |
| | | | | 381/92 |
| 7,831,036 | B2* | 11/2010 | Beaucoup | H04M 9/082 |
| | | | | 379/286 |
| 8,385,557 | B2* | 2/2013 | Tashev | H04M 9/082 |
| | | | | 379/406.01 |
| 8,811,601 | B2* | 8/2014 | Mohammad | H04B 3/234 |
| | | | | 379/406.01 |
| 9,008,327 | B2* | 4/2015 | Triki | H04M 9/082 |
| | | | | 381/71.1 |
| 2007/0258578 | A1* | 11/2007 | Hirai | H04M 9/082 |
| | | | | 379/406.01 |
| 2009/0103712 | A1* | 4/2009 | Frauenthal | H04M 9/082 |
| | | | | 379/406.12 |
| 2014/0328490 | A1* | 11/2014 | Mohammad | H04M 9/082 |
| | | | | 381/66 |
| 2014/0357323 | A1* | 12/2014 | Ahgren | H04M 9/082 |
| | | | | 455/570 |
| 2015/0063579 | A1* | 3/2015 | Bao | H04M 9/082 |
| | | | | 381/66 |

* cited by examiner

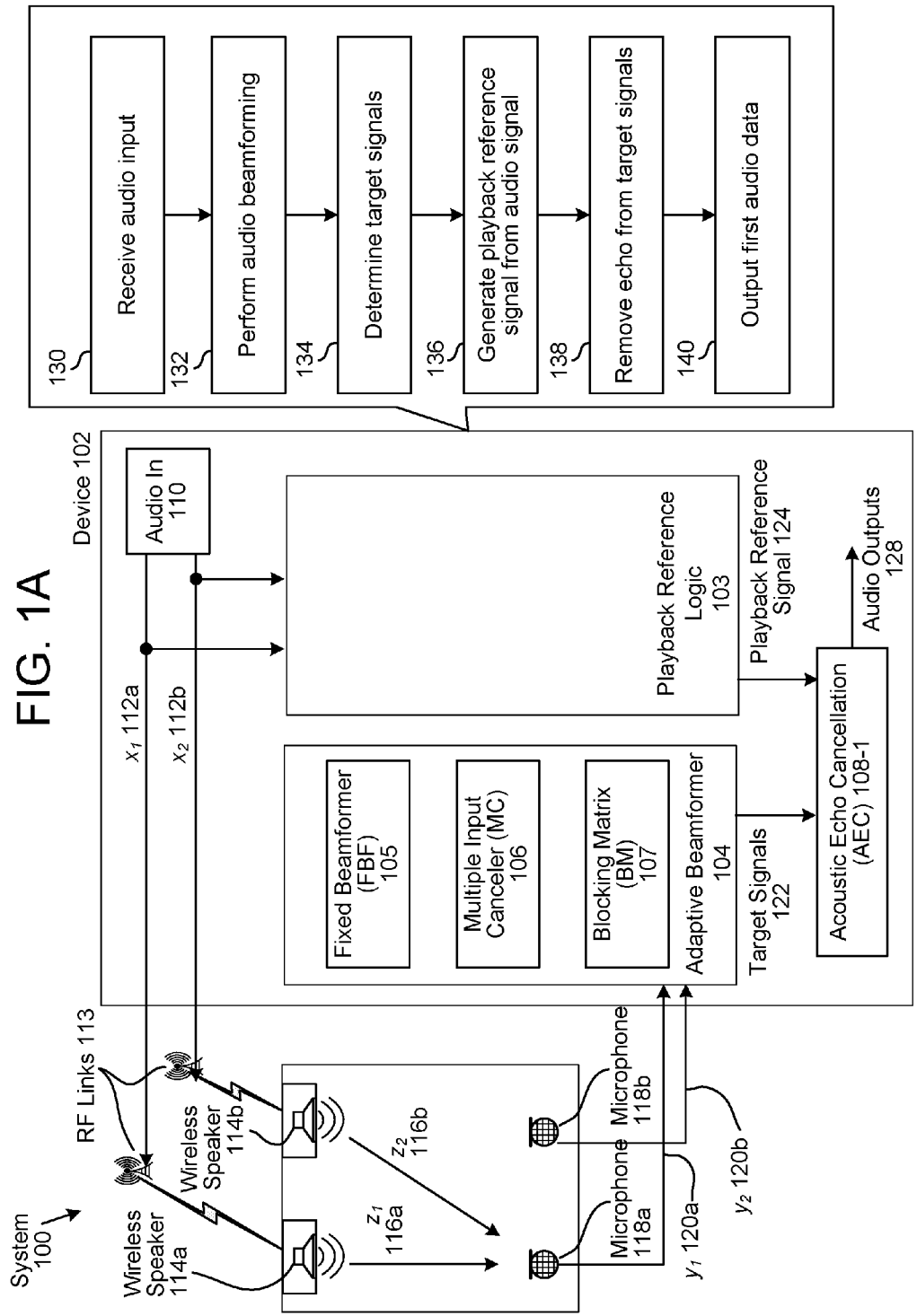

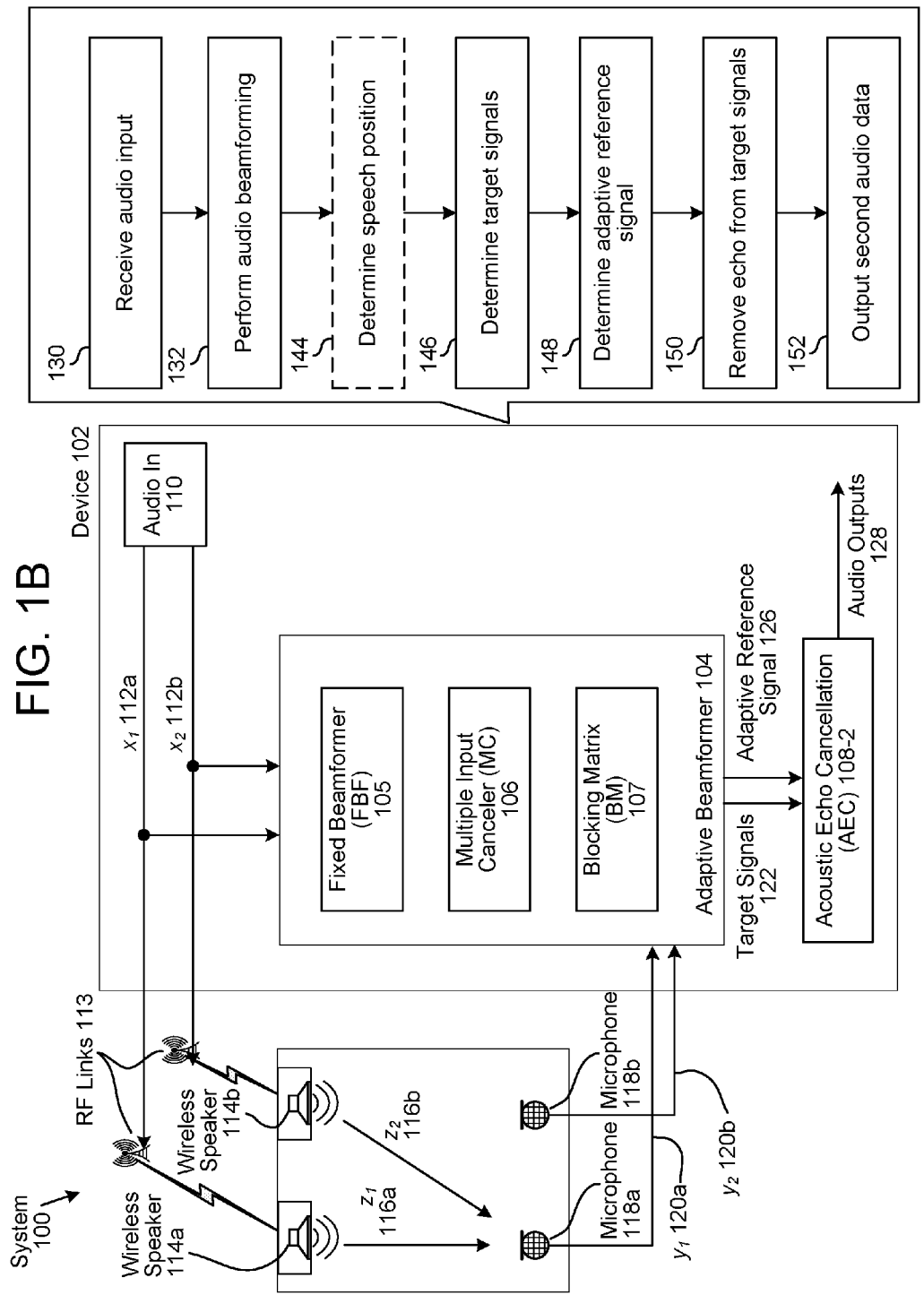

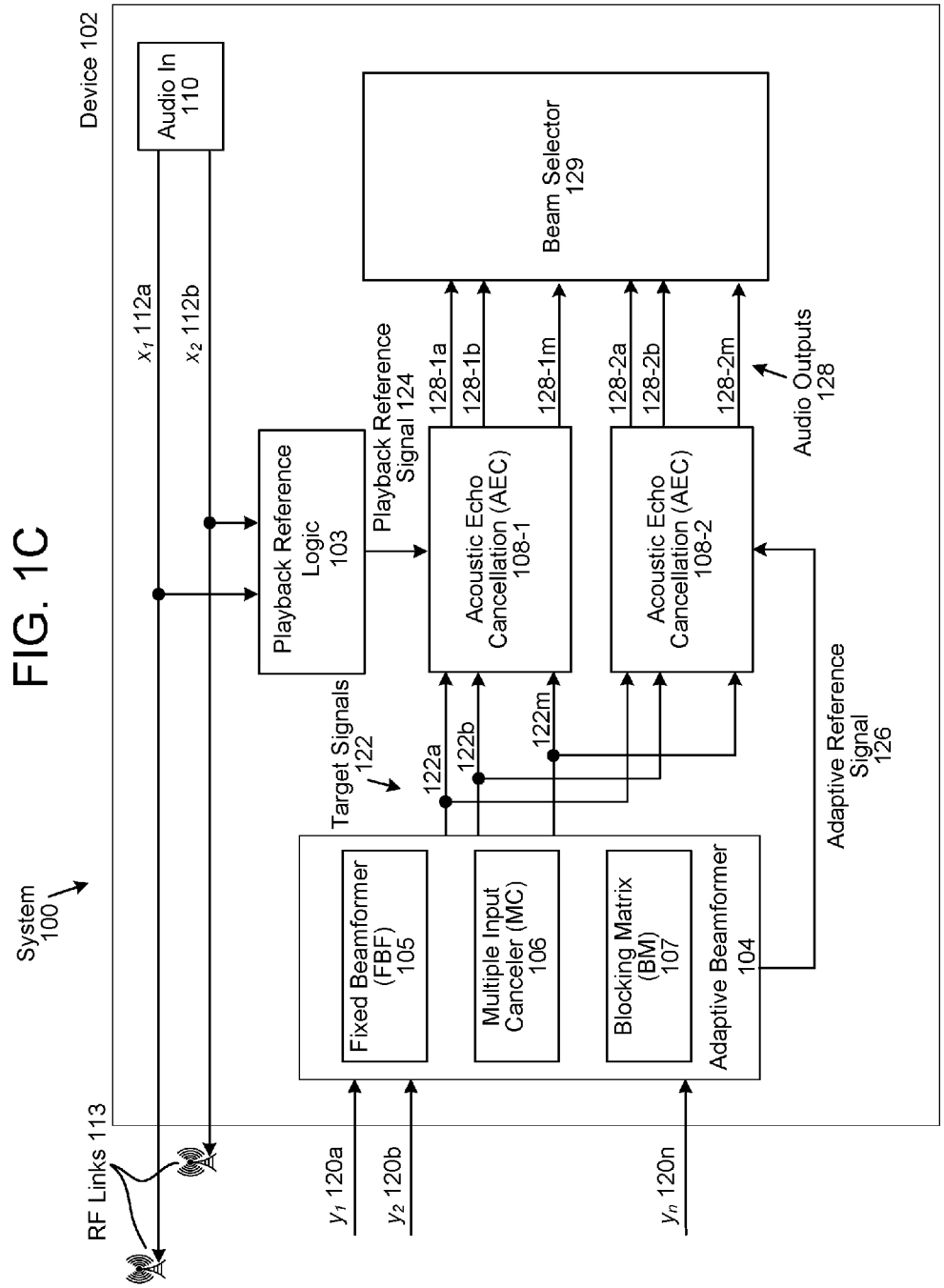

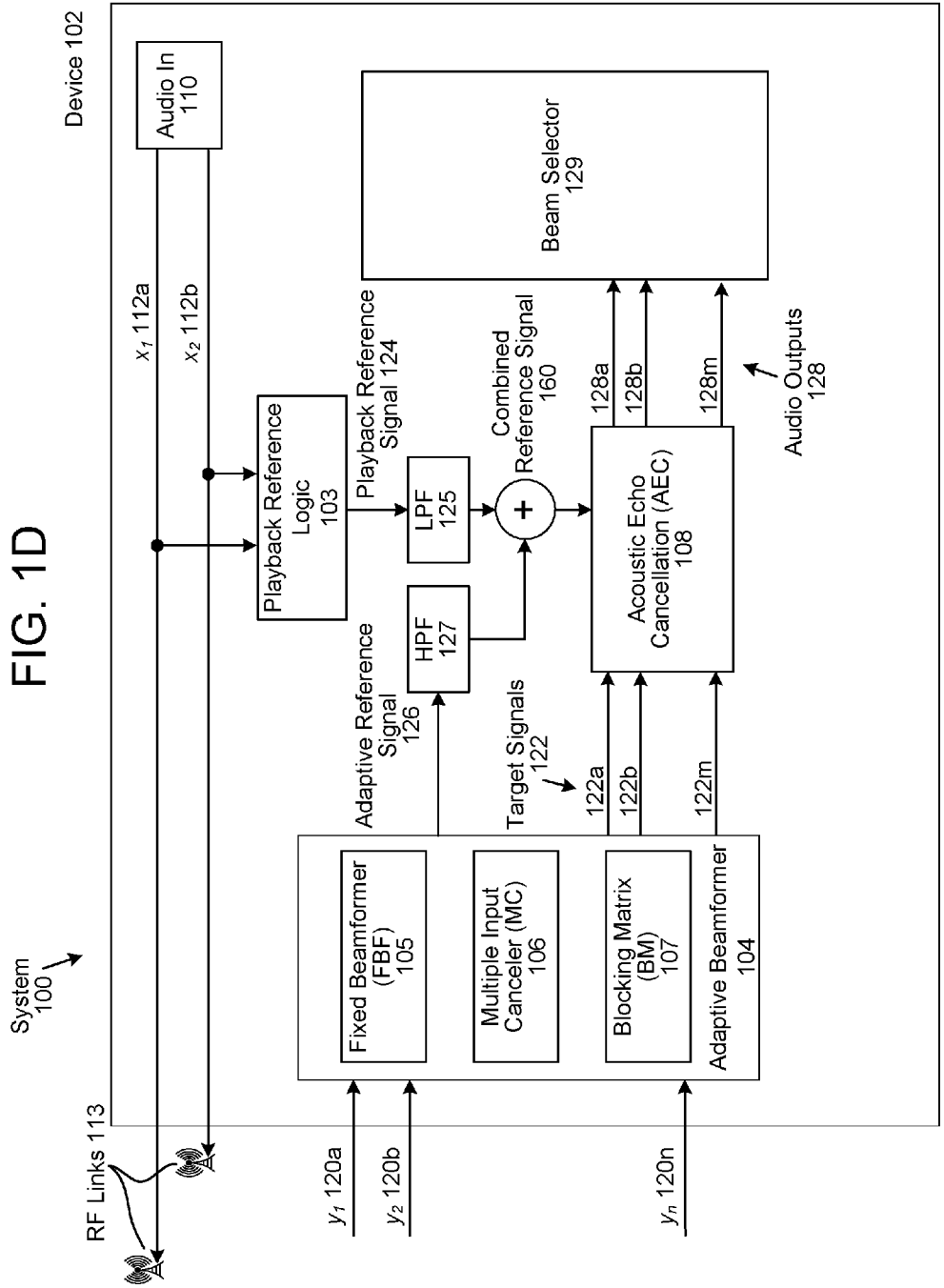

FIG. 4
Scenario A:
Clearly defined speaker signal
Configuration 410 →
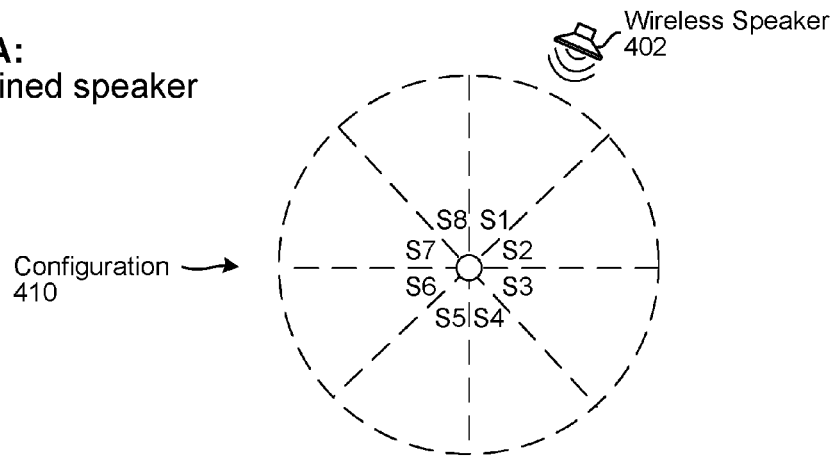
Scenario B:
Not clearly defined speaker signal
Identified look direction
Configuration 412 →
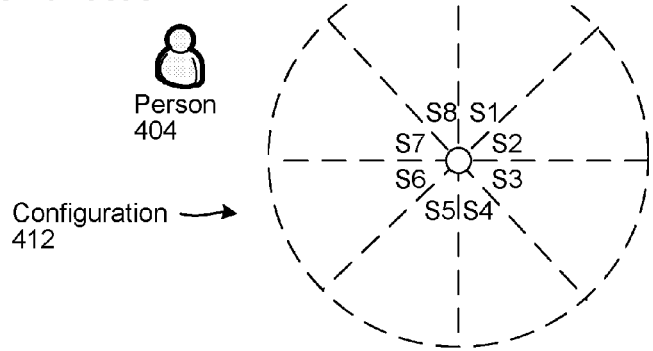
Scenario C:
Not clearly defined speaker signal
No identified look direction
Configuration 414 →
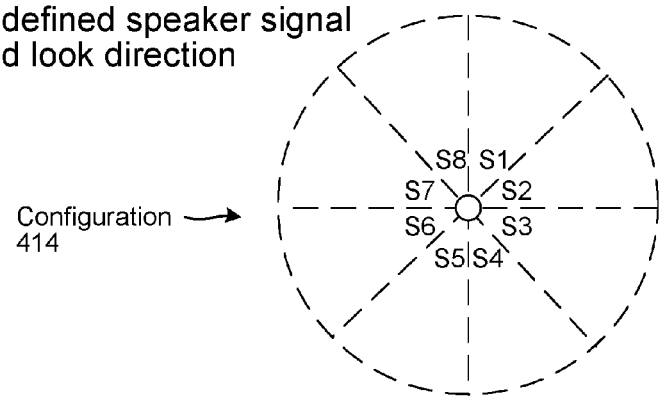

HYBRID REFERENCE SIGNAL FOR ACOUSTIC ECHO CANCELLATION

BACKGROUND

In audio systems, acoustic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIGS. 1A-1D illustrate echo cancellation systems according to embodiments of the present disclosure.

FIG. 4 illustrates an example of different techniques of adaptive beamforming according to embodiments of the present disclosure.

DETAILED DESCRIPTION

Figure 2:
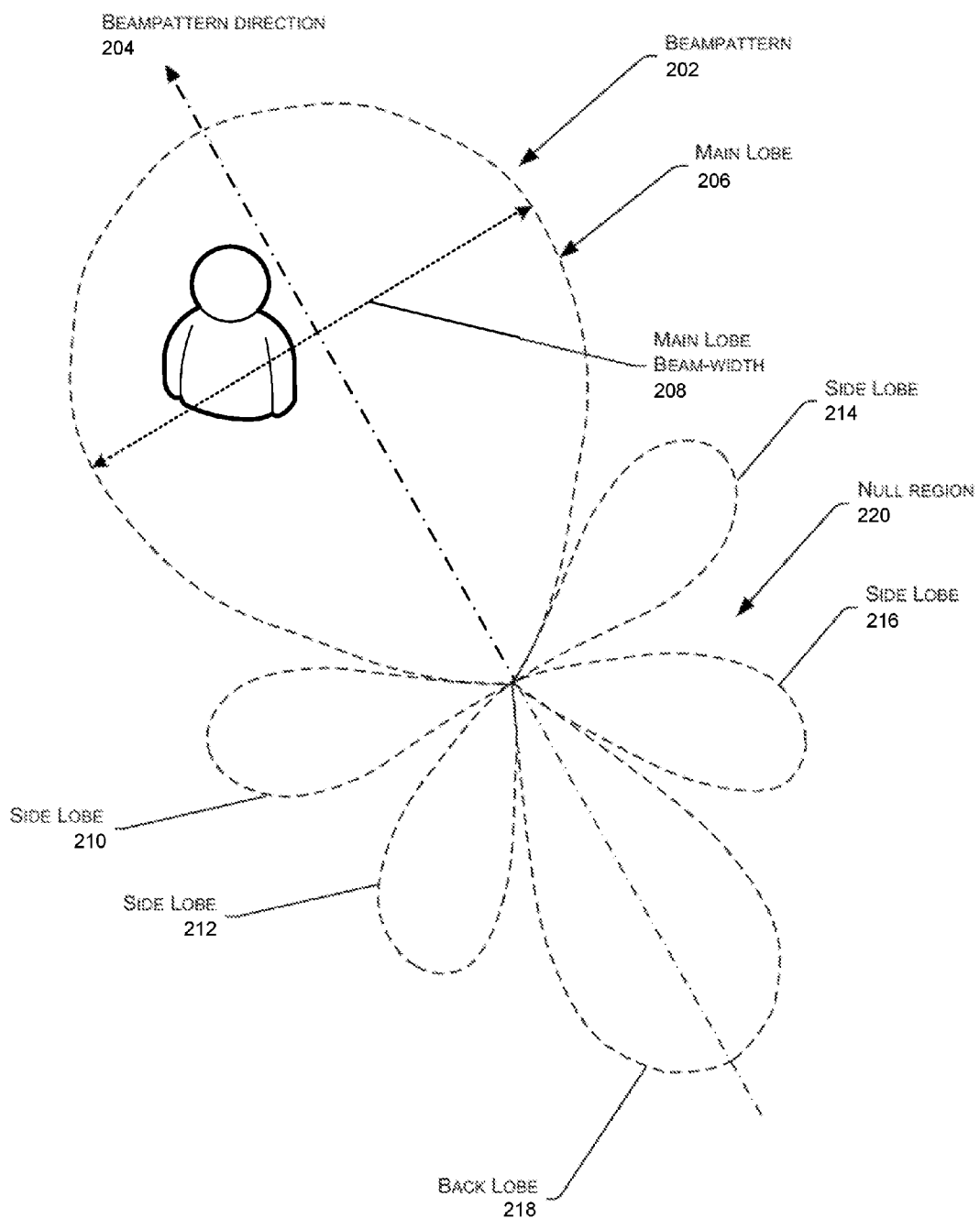
FIG. 2 is an illustration of beamforming according to embodiments of the present disclosure.

Typically, a conventional Acoustic Echo Cancellation (AEC) system may remove audio output by a loudspeaker from audio captured by the system's microphone(s) by subtracting a delayed version of the originally transmitted audio. However, in stereo and multi-channel audio systems that include wireless or network-connected loudspeakers and/or microphones, problem with the typical AEC approach may occur when there are differences between the signal sent to a loudspeaker and a signal received at the microphone. As the signal sent to the loudspeaker is not the same as the signal received at the microphone, the signal sent to the loudspeaker is not a true reference signal for the AEC system. For example, when the AEC system attempts to remove the audio output by the loudspeaker from audio captured by the system's microphone(s) by subtracting a delayed version of the originally transmitted audio, the audio captured by the microphone may be subtly different than the audio that had been sent to the loudspeaker.

There may be a difference between the signal sent to the loudspeaker and the signal played at the loudspeaker for one or more reasons. A first cause is a difference in clock synchronization (e.g., clock offset) between loudspeakers and microphones. For example, in a wireless "surround sound" 5.1 system comprising six wireless loudspeakers that each receive an audio signal from a surround-sound receiver, the receiver and each loudspeaker has its own crystal oscillator which provides the respective component with an independent "clock" signal. Among other things that the clock signals are used for is converting analog audio signals into digital audio signals ("A/D conversion") and converting digital audio signals into analog audio signals ("D/A conversion"). Such conversions are commonplace in audio systems, such as when a surround-sound receiver performs A/D conversion prior to transmitting audio to a wireless loudspeaker, and when the loudspeaker performs D/A conversion on the received signal to recreate an analog signal. The loudspeaker produces audible sound by driving a "voice coil" with an amplified version of the analog signal.

A second cause is that the signal sent to the loudspeaker may be modified based on compression/decompression during wireless communication, resulting in a different signal being received by the loudspeaker than was sent to the loudspeaker. A third case is non-linear post-processing performed on the received signal by the loudspeaker prior to playing the received signal. A fourth cause is buffering performed by the loudspeaker, which could create unknown latency, additional samples, fewer samples or the like that subtly change the signal played by the loudspeaker.

To perform Acoustic Echo Cancellation (AEC) without knowing the signal played by the loudspeaker, an Adaptive Reference Signal Selection Algorithm (ARSSA) AEC system may perform audio beamforming on a signal received by the microphones and may determine a reference signal and a target signal based on the audio beamforming. For example, the ARSSA AEC system may receive audio input and separate the audio input into multiple directions. The ARSSA AEC system may detect a strong signal associated with a speaker and may set the strong signal as a reference signal, selecting another direction as a target signal. In some examples, the ARSSA AEC system may determine a speech position (e.g., near end talk position) and may set the direction associated with the speech position as a target signal and an opposite direction as a reference signal. If the ARSSA AEC system cannot detect a strong signal or determine a speech position, the system may create pairwise combinations of opposite directions, with an individual direction being used as a target signal and a reference signal.

The ARSSA AEC system may remove the reference signal (e.g., audio output by the loudspeaker) to isolate speech included in the target signal.

In a linear system, there is no distortion, variable delay and/or frequency offset between the originally transmitted audio and the microphone input, and the conventional AEC system provides very good performance. However, when the system is nonlinear (e.g., there is distortion, variable delay and/or frequency offset), the ARSSA AEC system outperforms the conventional AEC system. In addition, a frequency offset and other nonlinear distortion between the originally transmitted audio and the microphone input affects higher frequencies differently than lower frequencies. For example, higher frequencies are rotated more significantly by the frequency offset relative to lower frequencies, complicating the task of removing the echo. Therefore, the conventional AEC system may provide good performance for low frequencies while the ARSSA AEC system may outperform the conventional AEC system for high frequencies.

To further improve echo cancellation, devices, systems and methods may combine the advantages of the conventional AEC system that uses a delayed version of the originally transmitted audio as a reference signal (e.g., playback reference signal) with the advantages of the Adaptive Reference Signal Selection Algorithm (ARSSA) AEC system that uses microphone input corresponding to the originally transmitted audio as a reference signal (e.g., adaptive reference signal). For example, a device may include a first conventional AEC circuit using the playback reference signal and a second ARSSA AEC circuit using the adaptive reference signal and may select an output from between the first conventional AEC circuit and the second ARSSA AEC circuit. Additionally or alternatively, the device may combine the playback reference with the adaptive reference to generate a combined reference signal and may perform acoustic echo cancellation using the combined reference signal. For example, the device may apply a low pass filter to the playback reference signal and apply a high pass filter to the adaptive reference signal and may combine the low frequencies of the playback reference signal with the high frequencies of the adaptive reference signal.

FIG. 1A illustrates a high-level conceptual block diagram of echo-cancellation aspects of an AEC system 100 using conventional AEC. As illustrated, an audio input 110 provides stereo audio "reference" signals $x_1(n)$ 112a and $x_2(n)$ 112b. The reference signal $x_1(n)$ 112a is transmitted via a radio frequency (RF) link 113 to a wireless loudspeaker 114a, and the reference signal $x_2(n)$ 112b is transmitted via an RF link 113 to a wireless loudspeaker 114b. Each speaker outputs the received audio, and portions of the output sounds are captured by a pair of microphones 118a and 118b as "echo" signals $y_1(n)$ 120a and $y_2(n)$ 120b, which contain some of the reproduced sounds from the reference signals $x_1(n)$ 112a and $x_2(n)$ 112b, in addition to any additional sounds (e.g., speech) picked up by the microphones 118.

To isolate the additional sounds from the reproduced sounds, the device 102 may include playback reference logic 103 that may generate a playback reference signal 124. To generate the playback reference signal, the playback reference logic 103 may receive the reference signals 112 (e.g., originally transmitted audio) and may compensate for distortion, variable delay, drift, skew and/or frequency offset. For example, the playback reference logic 103 may determine a propagation delay between the reference signals 112 and the echo signals 120 and may modify the reference signals 112 to remove the propagation delay. Additionally or alternatively, the playback reference logic 103 may determine a frequency offset between the modified reference signals 112 and the echo signals 120 and may add/drop samples of the modified reference signals and/or the echo signals 120 to compensate for the frequency offset. For example, the playback reference logic 103 may add at least one sample per cycle when the frequency offset is positive and may remove at least one sample per cycle when the frequency offset is negative. Therefore, the playback reference signal 124 may be aligned with the echo signals 120.

The device 102 may include an adaptive beamformer 104 that may perform audio beamforming on the echo signals 120 to determine target signals 122. For example, the adaptive beamformer 104 may include a fixed beamformer (FBF) 105, a multiple input canceler (MC) 106 and/or a blocking matrix (BM) 107. The FBF 105 may be configured to form a beam in a specific direction so that a target signal is passed and all other signals are attenuated, enabling the adaptive beamformer 104 to select a particular direction. In contrast, the BM 107 may be configured to form a null in a specific direction so that the target signal is attenuated and all other signals are passed. The adaptive beamformer 104 may generate fixed beamforms (e.g., outputs of the FBF 105) or may generate adaptive beamforms using a Linearly Constrained Minimum Variance (LCMV) beamformer, a Minimum Variance Distortionless Response (MVDR) beamformer or other beamforming techniques. For example, the adaptive beamformer 104 may receive audio input, determine six beamforming directions and output six fixed beamform outputs and six adaptive beamform outputs. In some examples, the adaptive beamformer 104 may generate six fixed beamform outputs, six LCMV beamform outputs and six MVDR beamform outputs, although the disclosure is not limited thereto. Using the adaptive beamformer 104 and techniques discussed below, the device 102 may determine the target signals 122 to pass to a first acoustic echo cancellation (AEC) 108-1. However, while FIG. 1A illustrates the device 102 including the adaptive beamformer 104, a traditional AEC system may perform AEC without the adaptive beamformer 104 without departing from the present disclosure.

The first AEC 108-1 may remove the playback reference signal 124 (e.g., reproduced sounds) from the target signals 122 (e.g., reproduced sounds and additional sounds) to remove the reproduced sounds and isolate the additional sounds (e.g., speech) as audio outputs 128. As the playback reference signal 124 is generated based on the reference signals 112, the audio outputs 128 of the first AEC 108-1 are examples of a conventional AEC system.

To illustrate, in some examples the device 102 may use outputs of the FBF 105 as the target signals 122. For example, the outputs of the FBF 105 may be shown in equation (1):

$$\text{Target} = s + z + \text{noise} \quad (1)$$

where s is speech (e.g., the additional sounds), z is an echo from the signal sent to the loudspeaker (e.g., the reproduced sounds) and noise is additional noise that is not associated with the speech or the echo. In order to attenuate the echo (z), the device 102 may use outputs of the playback reference logic 103 as the playback reference signal 124, which may be shown in equation 2:

$$\text{Reference} = z + \text{noise} \quad (2)$$

By removing the playback reference signal 124 from the target signals 122, the device 102 may remove the echo and generate the audio outputs 128 including only the speech and some noise. The device 102 may use the audio outputs 128 to perform speech recognition processing on the speech to determine a command and may execute the command. For example, the device 102 may determine that the speech corresponds to a command to play music and the device 102 may play music in response to receiving the speech.

As illustrated in FIG. 1A, the device 102 may receive (130) audio input and may perform (132) audio beamforming. For example, the device 102 may receive the audio input from the microphones 118 and may perform audio beamforming to separate the audio input into separate directions. The device 102 may determine (134) target signals 122, which may include a single target signal (e.g., echo signal 120 received from a microphone 118) or may include multiple target signals (e.g., target signal 122a, target signal 122b, . . . target signal 122n) that may be generated using the FBF 105 or other components of the adaptive beamformer 104.

The device 102 may generate (136) a playback reference signal from the audio signal (e.g., reference signal 112) sent to the loudspeakers 114. For example, the device 102 may compensate for distortion, variable delay, drift, skew and/or frequency offset, as discussed above with regard to the playback reference logic 103, so that the playback reference signal 124 is aligned with the echo signal 120 input to the microphones 118.

The device 102 may remove (138) an echo from the target signals by removing the playback reference signal to isolate speech or additional sounds and may output (140) first audio data including the speech or additional sounds. For example, the device 102 may remove music (e.g., reproduced sounds) played over the loudspeakers 114 to isolate a voice command input to the microphones 118. As the playback reference signal 124 is generated based on the reference signals 112, the first audio data is an example of a conventional AEC system.

FIG. 1B illustrates a high-level conceptual block diagram of echo-cancellation aspects of an AEC system 100 using an Adaptive Reference Signal Selection Algorithm (ARSSA). Many of the components are identical to the example illustrated in FIG. 1A and therefore a corresponding description may be omitted.

To isolate the additional sounds from the reproduced sounds, the device 102 may include the adaptive beamformer 104 that may perform audio beamforming on the echo signals 120 to determine target signals 122 and an adaptive reference signal 126. Using the adaptive beamformer 104 and techniques discussed below, the device 102 may determine the target signals 122 and the adaptive reference signal 126 to pass to a second acoustic echo cancellation (AEC) 108. The second AEC 108-2 may remove the adaptive reference signal 126 (e.g., reproduced sounds) from the target signals 122 (e.g., reproduced sounds and additional sounds) to remove the reproduced sounds and isolate the additional sounds (e.g., speech) as audio outputs 128. As the adaptive reference signal 126 is generated based on the echo signals 120 input to the microphones 118, the audio outputs 128 of the second AEC 108-2 are examples of an ARSSA AEC system.

As discussed above with regard to FIG. 1A, by removing the adaptive reference signal 126 from the target signals 122, the device 102 may remove the echo and generate the audio outputs 128 including only the speech and some noise. The device 102 may use the audio outputs 128 to perform speech recognition processing on the speech to determine a command and may execute the command. For example, the device 102 may determine that the speech corresponds to a command to play music and the device 102 may play music in response to receiving the speech.

In some examples, the device 102 may associate specific directions with the reproduced sounds and/or speech based on features of the signal sent to the loudspeaker. Examples of features includes power spectrum density, peak levels, pause intervals or the like that may be used to identify the signal sent to the loudspeaker and/or propagation delay between different signals. For example, the adaptive beamformer 104 may compare the signal sent to the loudspeaker with a signal associated with a first direction to determine if the signal associated with the first direction includes reproduced sounds from the loudspeaker. When the signal associated with the first direction matches the signal sent to the loudspeaker, the device 102 may associate the first direction with a wireless speaker (e.g., use the first direction as the adaptive reference signal 126). When the signal associated with the first direction does not match the signal sent to the loudspeaker, the device 102 may associate the first direction with speech, a speech position, a person or the like.

As illustrated in FIG. 1B, the device 102 may receive (130) the audio input and may perform (132) the audio beamforming. For example, the device 102 may receive the audio input from the microphones 118 and may perform audio beamforming to separate the audio input into separate directions.

The device 102 may optionally determine (144) a speech position (e.g., near end talk position) associated with speech and/or a person speaking. For example, the device 102 may identify the speech, a person and/or a position associated with the speech/person using audio data (e.g., audio beamforming when speech is recognized), video data (e.g., facial recognition) and/or other inputs known to one of skill in the art. The device 102 may determine (146) target signals, which may include a single target signal (e.g., echo signal 120 received from a microphone 118) or may include multiple target signals (e.g., target signal 122a, target signal 122b, . . . target signal 122n) that may be generated using the FBF 105 or other components of the adaptive beamformer 104. In some examples, the device 102 may determine the target signals based on the speech position. The device 102 may determine (148) an adaptive reference signal based on the speech position and/or the audio beamforming. For example, the device 102 may associate the speech position with a target signal and may select an opposite direction as the adaptive reference signal.

The device 102 may determine the target signals and the adaptive reference signal using multiple techniques, which are discussed in greater detail below. For example, the device 102 may use a first technique when the device 102 detects a clearly defined speaker signal, a second technique when the device 102 doesn't detect a clearly defined speaker signal but does identify a speech position and/or a third technique when the device 102 doesn't detect a clearly defined speaker signal or a speech position. Using the first technique, the device 102 may associate the clearly defined speaker signal with the adaptive reference signal and may select any or all of the other directions as the target signal. For example, the device 102 may generate a single target signal using all of the remaining directions for a single loudspeaker or may generate multiple target signals using portions of remaining directions for multiple loudspeakers. Using the second technique, the device 102 may associate the speech position with the target signal and may select an opposite direction as the adaptive reference signal. Using the third technique, the device 102 may select multiple combinations of opposing directions to generate multiple target signals and multiple adaptive reference signals.

The device 102 may remove (150) an echo from the target signal by removing the adaptive reference signal to isolate speech or additional sounds and may output (152) second audio data including the speech or additional sounds. For example, the device 102 may remove music (e.g., reproduced sounds) played over the loudspeakers 114 to isolate a voice command input to the microphones 118. As the adaptive reference signal 126 is generated based on the echo signals 120 input to the microphones 118, the second audio data is an example of an ARSSA AEC system.

While FIG. 1A illustrates a conventional AEC circuit (e.g., AEC 108-1) and FIG. 1B illustrates an ARSSA AEC circuit (e.g., AEC 108-2), FIGS. 1C-1D illustrate examples of combining the benefits of the conventional AEC circuit and the ARSSA AEC circuit to improve a performance of the device 102. As several components illustrated in FIGS. 1C-1D are illustrated in FIGS. 1A-1B, a corresponding description is omitted.

FIG. 1C illustrates a first example of combining the benefits of a conventional AEC circuit (e.g., AEC 108-1) and an ARSSA AEC circuit (e.g., AEC 108-2). For example, FIG. 1C illustrates an adaptive beamformer 104 receiving echo signals 120 (e.g., $y_1$ 120a, $y_2$ 120b, . . . $y_n$ 120n) from microphones 118 and generating a plurality of target signals 122 (e.g., 122a, 122b, . . . 122m). In some examples, the adaptive beamformer 104 may generate the same number of outputs as inputs, such that there is an equal number of echo signals 120 and target signals 122. However, the disclosure is not limited thereto and the number of target signals 122 may vary and does not need to match the number of echo signals 120. The adaptive beamformer 104 may generate the target signals 122 as discussed above with regard to FIGS. 1A-1B.

The adaptive beamformer 104 may output the target signals 122 to a first acoustic echo cancellation (AEC) 108-1 and the first AEC 108-1 may receive a playback reference signal 124 from playback reference logic 103. The playback reference logic 103 may generate the playback reference signal 124 from the reference signals 112, as discussed above with regard to FIG. 1A, and therefore the first AEC 108-1 is an example of a conventional AEC. The first AEC 108-1 may remove the playback reference signal 124 from the target signals 122 to generate first audio outputs 128-1 (e.g., 128-1a, 128-1b, . . . 128-1m) that are output to a beam selector 129.

The adaptive beamformer 104 may generate an adaptive reference signal 126 and may output the target signals 122 and the adaptive reference signal 126 to a second AEC 108-2. The adaptive beamformer 104 may generate the adaptive reference signal 126 from the echo signals 120 input to the microphones 118, as discussed above with regard to FIG. 1B, and therefore the second AEC 108-2 is an example of an ARSSA AEC. The second AEC 108-2 may remove the adaptive reference signal 126 from the target signals 122 to generate second audio outputs 128-2 (e.g., 128-2a, 128-2b, . . . 128-2m) that are output to the beam selector 129.

To improve a performance of the device 102, the beam selector 129 may dynamically select from the first outputs 128-1 and the second outputs 128-2 based on changing conditions. For example, the conventional AEC system (e.g., first AEC 108-1) provides good performance when the system is linear (e.g., no distortion, fixed delay and/or low frequency offset between the reference signals 112 and the echo signals 120 input to the microphones 118), whereas the ARSSA AEC system (e.g., second AEC 108-2) outperforms the conventional AEC system when the system is nonlinear (e.g., there is distortion, variable delay and/or high frequency offset between the reference signals 112 and the echo signals 120 input to the microphones 118).

To determine whether the system is linear, the device 102 may compare the reference signals 112 to the echo signals 120 and determine an amount and/or variation over time of distortion, propagation delay, drift (e.g., clock drift), skew and/or frequency offset between the reference signals 112 and the echo signals 120. For example, the device 102 may determine a first propagation delay at a first time and a second propagation delay at a second time and determine that the there is a variable delay if the first propagation delay is not similar to the second propagation delay. A variable delay is associate with a nonlinear system, as is an amount of distortion, drift, skew and/or frequency offset above a threshold or variations in the distortion, drift, skew and/or frequency offset. Additionally or alternatively, the device 102 may determine that the system is linear based on how the device 102 sends the reference signal 112 to the speaker 114. For example, the system is nonlinear when the device 102 sends the reference signal 112 to the speaker 114 wirelessly but may be linear when the device 102 sends the reference signal 112 to the speaker 114 using a wired line out output. The device 102 may also determine that the system is linear based on configurations of the system, such as if the device 102 knows the entire system or models a specific speaker. In contrast, if the device 102 outputs the reference signal 112 to an amplifier or unknown speaker, the device 102 may determine that the system is nonlinear as the device 102 cannot model how the amplifier or unknown speaker modifies the reference signal 112.

As the beam selector 129 receives the first audio outputs 128-1 and the second audio outputs 128-2, the beam selector 129 may dynamically select from between the first audio outputs 128-1 or the second audio outputs 128-2 based on changing conditions. For example, the device 102 may determine that the system is linear at a first time and the beam selector 129 may select from the first audio outputs 128-1 using the conventional AEC approach. However, the device 102 may determine that the system is nonlinear at a second time and the beam selector 129 may select from the second audio inputs 128-2 using the ARSSA AEC approach. Thus, the beam selector 129 may combine the benefits of the conventional AEC approach and the ARSSA AEC approach based on a linearity of the system. However, the present disclosure is not limited thereto and the beam selector 129 may select one or more of the audio outputs 128 without regard to the linearity of the system or whether the audio output was generated by the first AEC 108-1 or the second AEC 108-2 without departing from the disclosure. For example, the beam selector 129 may compare all of the audio outputs 128 (e.g., six first audio outputs 128-1 from the first AEC 108-1 and six second audio outputs 128-2 from the second AEC 108-2 for a total of twelve audio outputs 128) to select the one or more of the audio outputs 128.

The beam selector 129 may select the one or more of the audio outputs 128 based on various performance indicators, parameters or the like. For example, the beam selector 129 may select one or more of the audio outputs 128 based on a signal to noise ratio (SNR) of the audio outputs 128. In some examples, the beam selector 129 may select a first audio output 128-1a having a highest SNR of the first audio outputs 128-1 when the system is linear. Additionally or alternatively, the beam selector 129 may select one or more of the audio outputs 128 based solely on the SNR of the audio outputs 128 without regard to the linearity of the system.

FIG. 1D illustrates a second example of combining the benefits of a conventional AEC circuit (e.g., AEC 108-1) and an ARSSA AEC circuit (e.g., AEC 108-2). For example, FIG. 1D illustrates an adaptive beamformer 104 receiving echo signals 120 (e.g., $y_1$ 120a, $y_2$ 120b, ... $y_n$ 120n) from microphones 118 and generating a plurality of target signals 122 (e.g., 122a, 122b, ... 122m). In some examples, the adaptive beamformer 104 may generate the same number of outputs as inputs, such that there is an equal number of echo signals 120 and target signals 122. However, the disclosure is not limited thereto and the number of target signals 122 may vary and does not need to match the number of echo signals 120. The adaptive beamformer 104 may generate the target signals 122 as discussed above with regard to FIG. 1B. In addition, the adaptive beamformer 104 may generate an adaptive reference signal 126 from the echo signals 120 input to the microphones 118, as discussed above with regard to FIG. 1B and used in an ARSSA AEC.

Playback reference logic 103 may generate a playback reference signal 124 from the reference signals 112, as discussed above with regard to FIG. 1A and used in a conventional AEC. In contrast to the examples illustrated in FIGS. 1A-1C, however, the playback reference signal and the adaptive reference signal 126 may be combined to generate a combined reference signal 160. For example, a low pass filter (LPF) 125 may be applied to the playback reference signal 124 and a high pass filter (HPF) 127 may be applied to the adaptive reference signal 126 and the combined reference signal 160 may include a combination of the low frequencies of the playback reference signal 124 and the high frequencies of the adaptive reference signal 126.

A first cutoff frequency between the LPF 125 and the HPF 127 may be fixed based on a parameter associated with the device 102. For example, the first cutoff frequency may be based on a distance between microphones 118 in the microphone array design. Therefore, the LPF 125 may pass frequencies below the first cutoff frequency and the HPF 127 may pass frequencies above the first cutoff frequency. In some examples, the HPF 127 may pass frequencies between the first cutoff frequency and a second cutoff frequency. For example, the second cutoff frequency may be based on a sampling frequency of the microphones 118 (e.g., half of the sampling frequency) and the HPF 127 may attenuate frequencies above the second cutoff frequency to reduce distortion.

An AEC 108 may receive the target signals 122 and the combined reference signal 160 and may remove the combined reference signal 160 from the target signals 122 to generate audio outputs 128 (e.g., 128a, 128b, ... 128m) that are output to a beam selector 129. The beam selector 129 may select one or more of the audio outputs 128 based on a signal to noise ratio (SNR) of the audio outputs 128. For example, the beam selector 129 may select a first audio output 128a having a highest SNR of the audio outputs 128, although the disclosure is not limited thereto.

As discussed above, a frequency offset and other nonlinear distortion between the originally transmitted audio (e.g., reference signals 112) and the microphone input (e.g., echo signals 120) affects higher frequencies differently than lower frequencies. For example, higher frequencies are rotated more significantly by the frequency offset relative to lower frequencies, complicating the task of removing the echo. Therefore, a conventional AEC system (e.g., using playback reference signal 124) may provide good performance for low frequencies while the ARSSA AEC system (e.g., using adaptive reference signal 126) may outperform the conventional AEC system for high frequencies. By combining the playback reference signal 124 and the adaptive reference signal 126, the device 102 may generate audio outputs 128 with improved performance for low frequencies (using the playback reference signal 124) and high frequencies (using the adaptive reference 126).

The device 102 may include a microphone array having multiple microphones 118 that are laterally spaced from each other so that they can be used by audio beamforming components to produce directional audio signals. The microphones 118 may, in some instances, be dispersed around a perimeter of the device 102 in order to apply beampatterns to audio signals based on sound captured by the microphone(s) 118. For example, the microphones 118 may be positioned at spaced intervals along a perimeter of the device 102, although the present disclosure is not limited thereto. In some examples, the microphone(s) 118 may be spaced on a substantially vertical surface of the device 102 and/or a top surface of the device 102. Each of the microphones 118 is omnidirectional, and beamforming technology is used to produce directional audio signals based on signals from the microphones 118. In other embodiments, the microphones may have directional audio reception, which may remove the need for subsequent beamforming.

In various embodiments, the microphone array may include greater or less than the number of microphones 118 shown. Speaker(s) (not illustrated) may be located at the bottom of the device 102, and may be configured to emit sound omnidirectionally, in a 360 degree pattern around the device 102. For example, the speaker(s) may comprise a round speaker element directed downwardly in the lower part of the device 102.

Using the plurality of microphones 118 the device 102 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 102 may include an adaptive beamformer 104 that may include one or more audio beamformers or beamforming components that are configured to generate an audio signal that is focused in a direction from which user speech has been detected. More specifically, the beamforming components may be responsive to spatially separated microphone elements of the microphone array to produce directional audio signals that emphasize sounds originating from different directions relative to the device 102, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

FIG. 2 is an illustration of beamforming according to embodiments of the present disclosure. FIG. 2 illustrates a schematic of a beampattern 202 formed by applying beamforming coefficients to signal data acquired from a microphone array of the device 102. As mentioned above, the beampattern 202 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 202 may exhibit a plurality of lobes, or regions of gain, with gain predominating in a particular direction designated the beampattern direction 204. A main lobe 206 is shown here extending along the beampattern direction 204. A main lobe beam-width 208 is shown, indicating a maximum width of the main lobe 206. In this example, the beampattern 202 also includes side lobes 210, 212, 214, and 216. Opposite the main lobe 206 along the beampattern direction 204 is the back lobe 218. Disposed around the beampattern 202 are null regions 220. These null regions are areas of attenuation to signals. In the example, the person 10 resides within the main lobe 206 and benefits from the gain provided by the beampattern 202 and exhibits an improved SNR ratio compared to a signal acquired with non-beamforming. In contrast, if the person 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 102 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 102 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the device 102 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

Figure 3A:
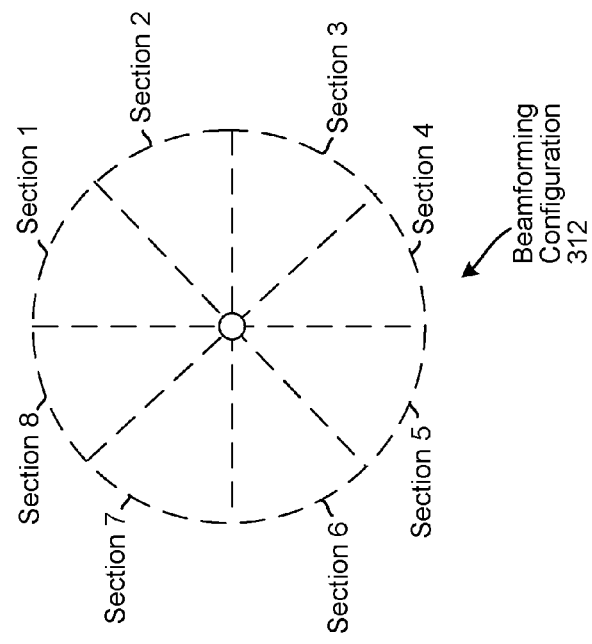
FIGS. 3A-3B illustrate examples of beamforming configurations according to embodiments of the present disclosure.
Figure 3B:
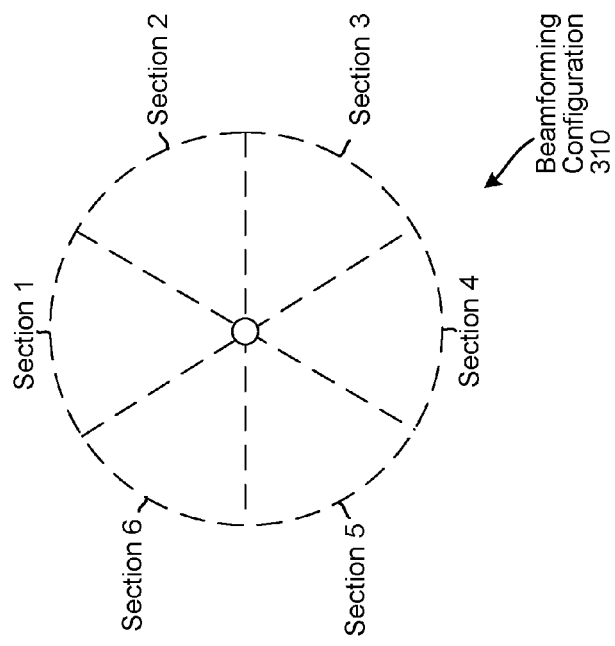

FIGS. 3A-3B illustrate examples of beamforming configurations according to embodiments of the present disclosure. As illustrated in FIG. 3A, the device 102 may perform beamforming to determine a plurality of portions or sections of audio received from a microphone array. FIG. 3A illustrates a beamforming configuration 310 including six portions or sections (e.g., Sections 1-6). For example, the device 102 may include six different microphones, may divide an area around the device 102 into six sections or the like. However, the present disclosure is not limited thereto and the number of microphones in the microphone array and/or the number of portions/sections in the beamforming may vary. As illustrated in FIG. 3B, the device 102 may generate a beamforming configuration 312 including eight portions/sections (e.g., Sections 1-8) without departing from the disclosure. For example, the device 102 may include eight different microphones, may divide the area around the device 102 into eight portions/sections or the like. Thus, the following examples may perform beamforming and separate an audio signal into eight different portions/sections, but these examples are intended as illustrative examples and the disclosure is not limited thereto.

The number of portions/sections generated using beamforming does not depend on the number of microphones in the microphone array. For example, the device 102 may include twelve microphones in the microphone array but may determine three portions, six portions or twelve portions of the audio data without departing from the disclosure. As discussed above, the adaptive beamformer 104 may generate fixed beamforms (e.g., outputs of the FBF 105) or may generate adaptive beamforms using a Linearly Constrained Minimum Variance (LCMV) beamformer, a Minimum Variance Distortionless Response (MVDR) beamformer or other beamforming techniques. For example, the adaptive beamformer 104 may receive the audio input, may determine six beamforming directions and output six fixed beamform outputs and six adaptive beamform outputs corresponding to the six beamforming directions. In some examples, the adaptive beamformer 104 may generate six fixed beamform outputs, six LCMV beamform outputs and six MVDR beamform outputs, although the disclosure is not limited thereto.

The device 102 may determine a number of wireless loudspeakers and/or directions associated with the wireless loudspeakers using the fixed beamform outputs. For example, the device 102 may localize energy in the frequency domain and clearly identify much higher energy in two directions associated with two wireless loudspeakers (e.g., a first direction associated with a first speaker and a second direction associated with a second speaker). In some examples, the device 102 may determine an existence and/or location associated with the wireless loudspeakers using a frequency range (e.g., 1 kHz to 3 kHz), although the disclosure is not limited thereto. In some examples, the device 102 may determine an existence and location of the wireless speaker(s) using the fixed beamform outputs, may select a portion of the fixed beamform outputs as the target signal(s) and may select a portion of adaptive beamform outputs corresponding to the wireless speaker(s) as the reference signal(s).

To perform echo cancellation, the device 102 may determine a target signal and a reference signal and may remove the reference signal from the target signal to generate an output signal. For example, the loudspeaker may output audible sound associated with a first direction and a person may generate speech associated with a second direction. To remove the audible sound output from the loudspeaker, the device 102 may select a first portion of audio data corresponding to the first direction as the reference signal and may select a second portion of the audio data corresponding to the second direction as the target signal. However, the disclosure is not limited to a single portion being associated with the reference signal and/or target signal and the device 102 may select multiple portions of the audio data corresponding to multiple directions as the reference signal/target signal without departing from the disclosure. For example, the device 102 may select a first portion and a second portion as the reference signal and may select a third portion and a fourth portion as the target signal.

Additionally or alternatively, the device 102 may determine more than one reference signal and/or target signal. For example, the device 102 may identify a first wireless speaker and a second wireless speaker and may determine a first reference signal associated with the first wireless speaker and determine a second reference signal associated with the second wireless speaker. The device 102 may generate a first output by removing the first reference signal from the target signal and may generate a second output by removing the second reference signal from the target signal. Similarly, the device 102 may select a first portion of the audio data as a first target signal and may select a second portion of the audio data as a second target signal. The device 102 may therefore generate a first output by removing the reference signal from the first target signal and may generate a second output by removing the reference signal from the second target signal.

The device 102 may determine reference signals, target signals and/or output signals using any combination of portions of the audio data without departing from the disclosure. For example, the device 102 may select first and second portions of the audio data as a first reference signal, may select a third portion of the audio data as a second reference signal and may select remaining portions of the audio data as a target signal. In some examples, the device 102 may include the first portion in a first reference signal and a second reference signal or may include the second portion in a first target signal and a second target signal. If the device 102 selects multiple target signals and/or reference signals, the device 102 may remove each reference signal from each of the target signals individually (e.g., remove reference signal 1 from target signal 1, remove reference signal 1 from target signal 2, remove reference signal 2 from target signal 1, etc.), may collectively remove the reference signals from each individual target signal (e.g., remove reference signals 1-2 from target signal 1, remove reference signals 1-2 from target signal 2, etc.), remove individual reference signals from the target signals collectively (e.g., remove reference signal 1 from target signals 1-2, remove reference signal 2 from target signals 1-2, etc.) or any combination thereof without departing from the disclosure.

The device 102 may select fixed beamform outputs or adaptive beamform outputs as the target signal(s) and/or the reference signal(s) without departing from the disclosure. In a first example, the device 102 may select a first fixed beamform output (e.g., first portion of the audio data determined using fixed beamforming techniques) as a reference signal and a second fixed beamform output as a target signal. In a second example, the device 102 may select a first adaptive beamform output (e.g., first portion of the audio data determined using adaptive beamforming techniques) as a reference signal and a second adaptive beamform output as a target signal. In a third example, the device 102 may select the first fixed beamform output as the reference signal and the second adaptive beamform output as the target signal. In a fourth example, the device 102 may select the first adaptive beamform output as the reference signal and the second fixed beamform output as the target signal. However, the disclosure is not limited thereto and further combinations thereof may be selected without departing from the disclosure.

FIG. 4 illustrates an example of different techniques of adaptive beamforming according to embodiments of the present disclosure. As illustrated in FIG. 4, a first technique may be used with scenario A, which may occur when the device 102 detects a clearly defined speaker signal. For example, the configuration 410 includes a wireless speaker 402 and the device 102 may associate the wireless speaker 402 with a first section S1. The device 102 may identify the wireless speaker 402 and/or associate the first section S1 with a wireless speaker. As will be discussed in greater detail below, the device 102 may set the first section S1 as a reference signal and may identify one or more sections as a target signal. While the configuration 410 includes a single wireless speaker 402, the disclosure is not limited thereto and there may be multiple wireless speakers 402.

As illustrated in FIG. 4, a second technique may be used with scenario B, which occurs when the device 102 doesn't detect a clearly defined speaker signal but does identify a speech position (e.g., near end talk position) associated with person 404. For example, the device 102 may identify the person 404 and/or a position associated with the person 404 using audio data (e.g., audio beamforming), video data (e.g., facial recognition) and/or other inputs known to one of skill in the art. As illustrated in FIG. 4, the device 102 may associate the person 404 with section S7. By determining the position associated with the person 404, the device 102 may set the section (e.g., S7) as a target signal and may set one or more sections as reference signals.

As illustrated in FIG. 4, a third technique may be used with scenario C, which occurs when the device 102 doesn't detect a clearly defined speaker signal or a speech position. For example, audio from a wireless speaker may reflect off of multiple objects such that the device 102 receives the audio from multiple locations at a time and is therefore unable to locate a specific section to associate with the wireless speaker. Due to the lack of a defined speaker signal and a speech position, the device 102 may remove an echo by creating pairwise combinations of the sections. For example, as will be described in greater detail below, the device 102 may use a first section S1 as a target signal and a fifth section S5 as a reference signal in a first equation and may use the fifth section S5 as a target signal and the first section S1 as a reference signal in a second equation. The device 102 may combine each of the different sections such that there are the same number of equations (e.g., eight) as sections (e.g., eight).

Figure 5:
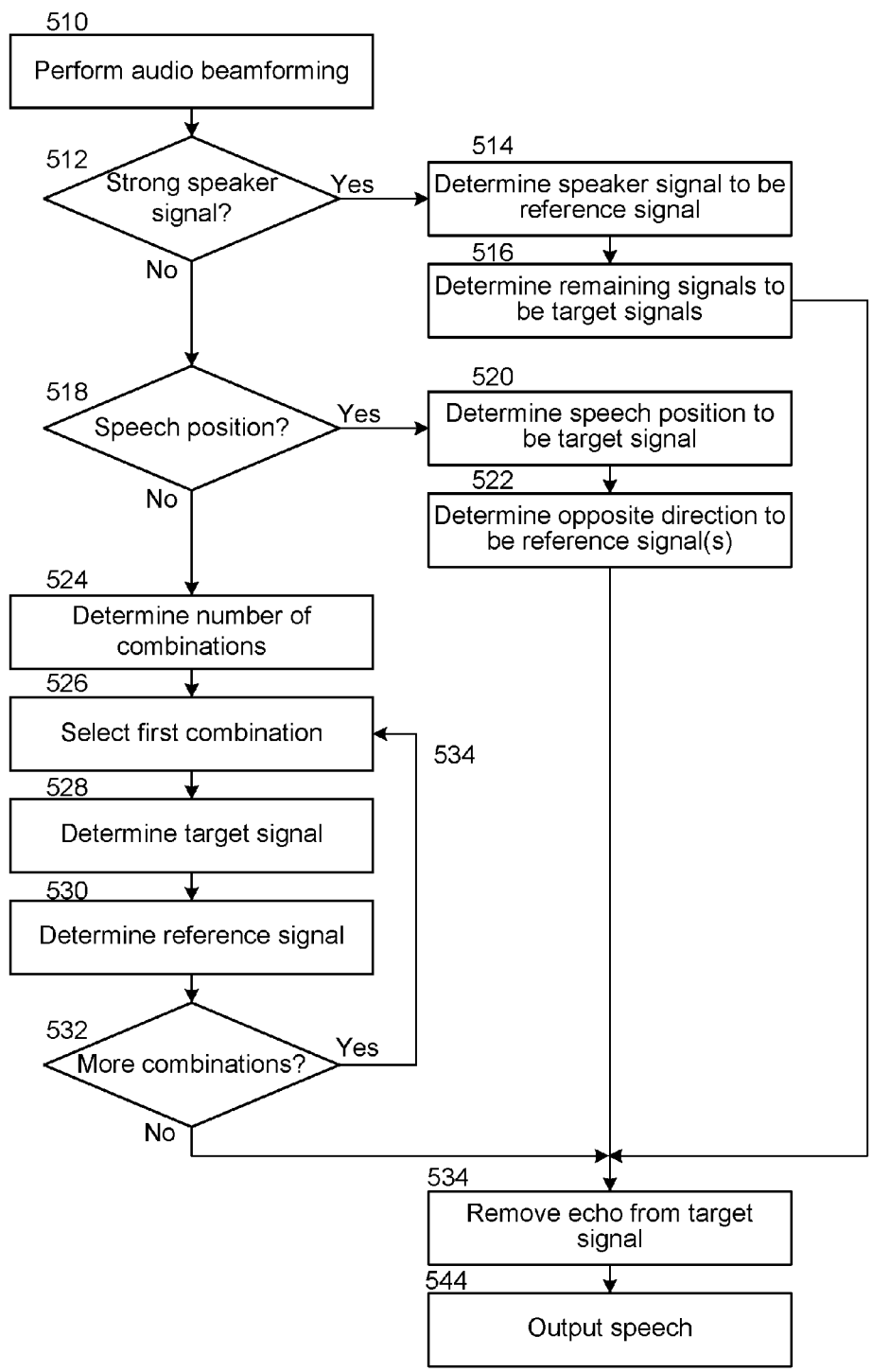
FIG. 5 is a flowchart conceptually illustrating an example method for determining a signal mapping according to embodiments of the present disclosure.

FIG. 5 is a flowchart conceptually illustrating an example method for determining a signal mapping according to embodiments of the present disclosure. As illustrated in FIG. 5, the device 102 may perform (510) audio beamforming to separate audio data into multiple sections. The device 102 may determine (512) if there is a strong speaker signal in one or more of the sections. If there is a strong speaker signal, the device 102 may determine (514) the speaker signal (e.g., section associated with the speaker signal) to be a reference signal and may determine (516) remaining signals to be target signals. The device 102 may then remove (140) an echo from the target signal using the reference signal and may output (142) speech, as discussed above with regard to FIG. 1B.

While not illustrated in FIG. 5, if the device 102 detects two or more strong speaker signals, the device 102 may determine one or more reference signals corresponding to the two or more strong speaker signals and may determine one or more target signals corresponding to the remaining portions of the audio beamforming, As discussed above, the device 102 may determine any combination of target signals, reference signals and output signals without departing from the disclosure. For example, as discussed above with regard to FIG. 6B, the device 102 may determine reference signals associated with the wireless speakers and may select remaining portions of the beamforming output as target signals. Additionally or alternatively, as illustrated in FIG. 6C, if the device 102 detects multiple wireless speakers then the device 102 may generate separate reference signals, with each wireless speaker associated with a reference signal and sections opposite the reference signals associated with corresponding target signals. For example, the device 102 may detect a first wireless speaker, determine a corresponding section to be a first reference signal, determine one or more sections opposite the first reference signal and determine the one or more sections to be first target signals. Then the device 102 may detect a second wireless speaker, determine a corresponding section to be a second reference signal, determine one or more sections opposite the second reference signal and determine the one or more sections to be second target signals.

If the device 102 does not detect a strong speaker signal, the device 102 may determine (518) if there is a speech position in the audio data or associated with the audio data. For example, the device 102 may identify a person speaking and/or a position associated with the person using audio data (e.g., audio beamforming), associated video data (e.g., facial recognition) and/or other inputs known to one of skill in the art. In some examples, the device 102 may determine that speech is associated with a section and may determine a speech position using the section. In other examples, the device 102 may receive video data associated with the audio data and may use facial recognition or other techniques to determine a position associated with a face recognized in the video data. If the device 102 detects a speech position, the device 102 may determine (520) the speech position to be a target signal and may determine (522) an opposite direction to be reference signal(s). For example, a first section S1 may be associated with the target signal and the device 102 may determine that a fifth section S5 is opposite the first section S1 and may use the fifth section S5 as the reference signal. The device 102 may determine more than one section to be reference signals without departing from the disclosure. The device 102 may then remove (140) an echo from the target signal using the reference signal(s) and may output (142) speech, as discussed above with regard to FIG. 1B. While not illustrated in FIG. 5, the device 102 may determine two or more speech positions (e.g., near end talk positions) and may determine one or more target signals based on the two or more speech positions. For example, the device 102 may select multiple sections of the audio beamforming corresponding to the two or more speech positions as a single target signal, or the device 102 may select first sections of the audio beamforming corresponding to a first speech position as a first target signal and may select second sections of the audio beamforming corresponding to a second speech position as a second target signal.

If the device 102 does not detect a speech position, the device 102 may determine (524) a number of combinations based on the audio beamforming. For example, the device 102 may determine a number of combinations of opposing sections and/or microphones, as illustrated in FIGS. 8A-8B. The device 102 may select (526) a first combination, determine (828) a target signal and determine (530) a reference signal. For example, the device 102 may select a first section 51 as a target signal and select a fifth section S5, opposite the first section 51, as a reference signal. The device 102 may determine (532) if there are additional combinations and if so, may loop (534) to step 526 and repeat steps 526-530. For example, in a later combination the device 102 may select the fifth section S5 as a target signal and the first section 51 as a reference signal. Once the device 102 has determined a target signal and a reference signal for each combination, the device 102 may remove (140) an echo from the target signals using the reference signals and output (142) speech, as discussed above with regard to FIG. 1B.

Figure 6:
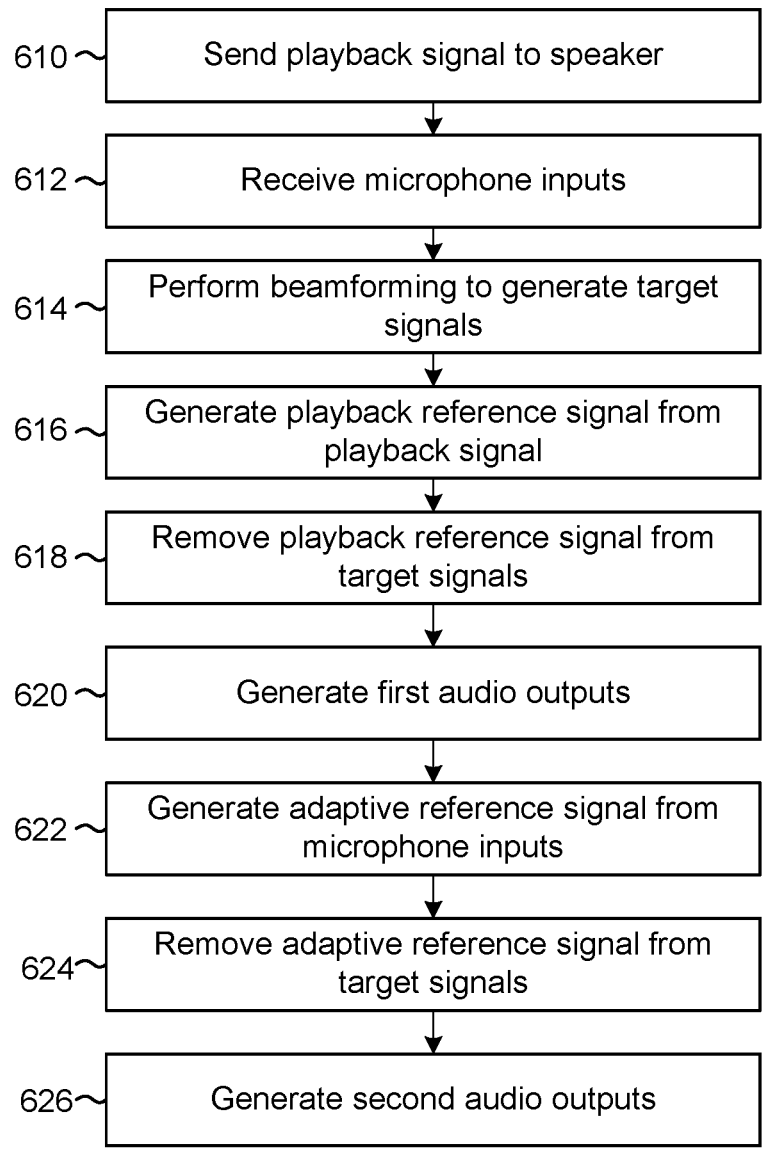
FIG. 6 is a flowchart conceptually illustrating an example method for generating audio outputs using multiple echo cancellation circuits according to embodiments of the present disclosure.

FIG. 6 is a flowchart conceptually illustrating an example method for generating audio outputs using multiple echo cancellation circuits according to embodiments of the present disclosure. As illustrated in FIG. 6, the device 102 may send (610) a playback signal to a wireless speaker and may receive (612) microphone inputs (e.g., echo signals) corresponding to the playback signal. The device 102 may perform (614) beamforming on the received microphone inputs to separate the received microphone inputs into multiple beams associated with corresponding directions (e.g., target signals). The device 102 may generate (616) a playback reference signal from the playback signal, may remove (618) the playback reference signal from the target signals and may generate (620) first audio outputs. The device 102 may generate (622) an adaptive reference signal from the microphone inputs, may remove (624) the adaptive reference signal from the target signals and may generate (626) second audio outputs.

Figure 7:
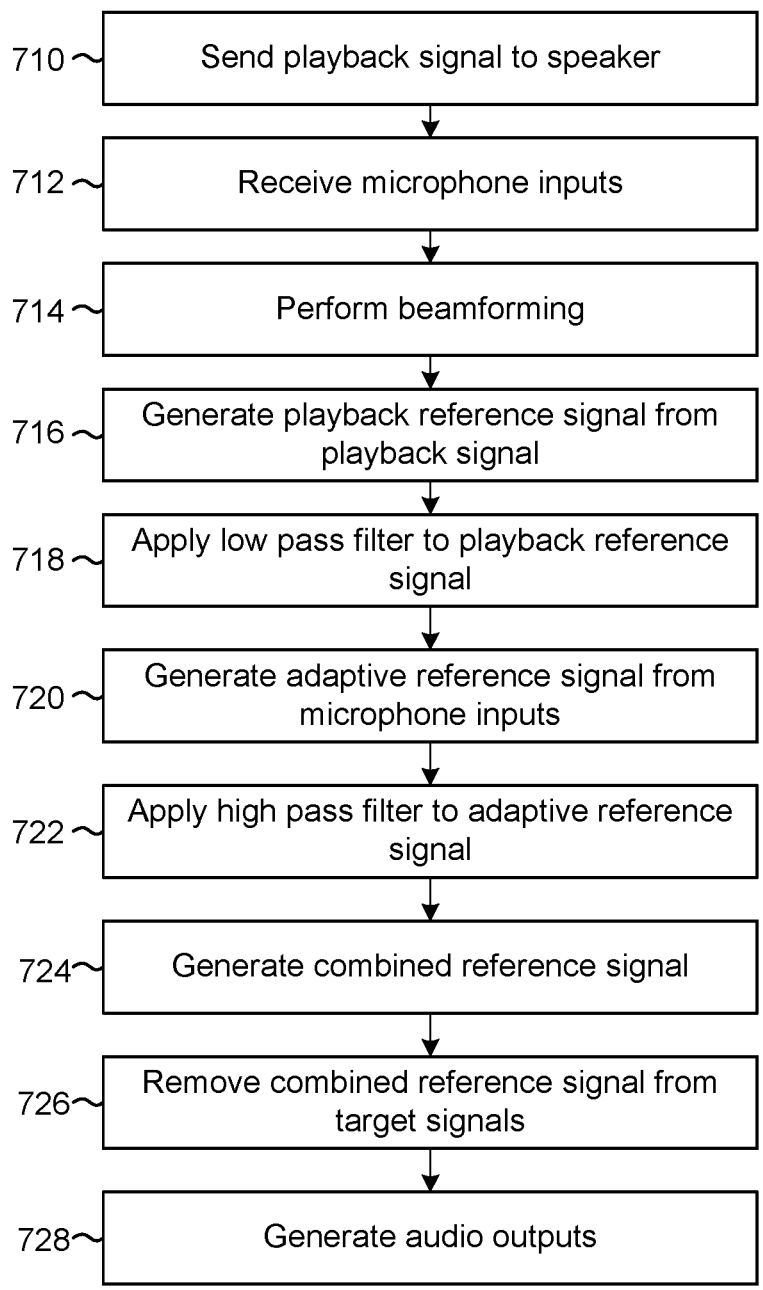
FIG. 7 is a flowchart conceptually illustrating an example method for combining an adaptive reference signal and a playback reference signal according to embodiments of the present disclosure.

FIG. 7 is a flowchart conceptually illustrating an example method for combining an adaptive reference signal and a playback reference signal according to embodiments of the present disclosure. As illustrated in FIG. 7, the device 102 may send (710) a playback signal to a wireless speaker and may receive (712) microphone inputs (e.g., echo signals) corresponding to the playback signal. The device 102 may perform (714) beamforming on the received microphone inputs to separate the received microphone inputs into multiple beams associated with corresponding directions (e.g., target signals).

The device 102 may generate (716) a playback reference signal from the playback signal and may apply (618) a low pass filter to the playback reference signal. The device 102 may generate (720) an adaptive reference signal from the microphone inputs and may apply (622) a high pass filter to the adaptive reference signal. The device 102 may generate (724) a combined reference signal using the outputs of the low pass filter and the high pass filter, may remove (726) the combined reference signal from the target signals and may generate (728) audio outputs.

Figure 8:
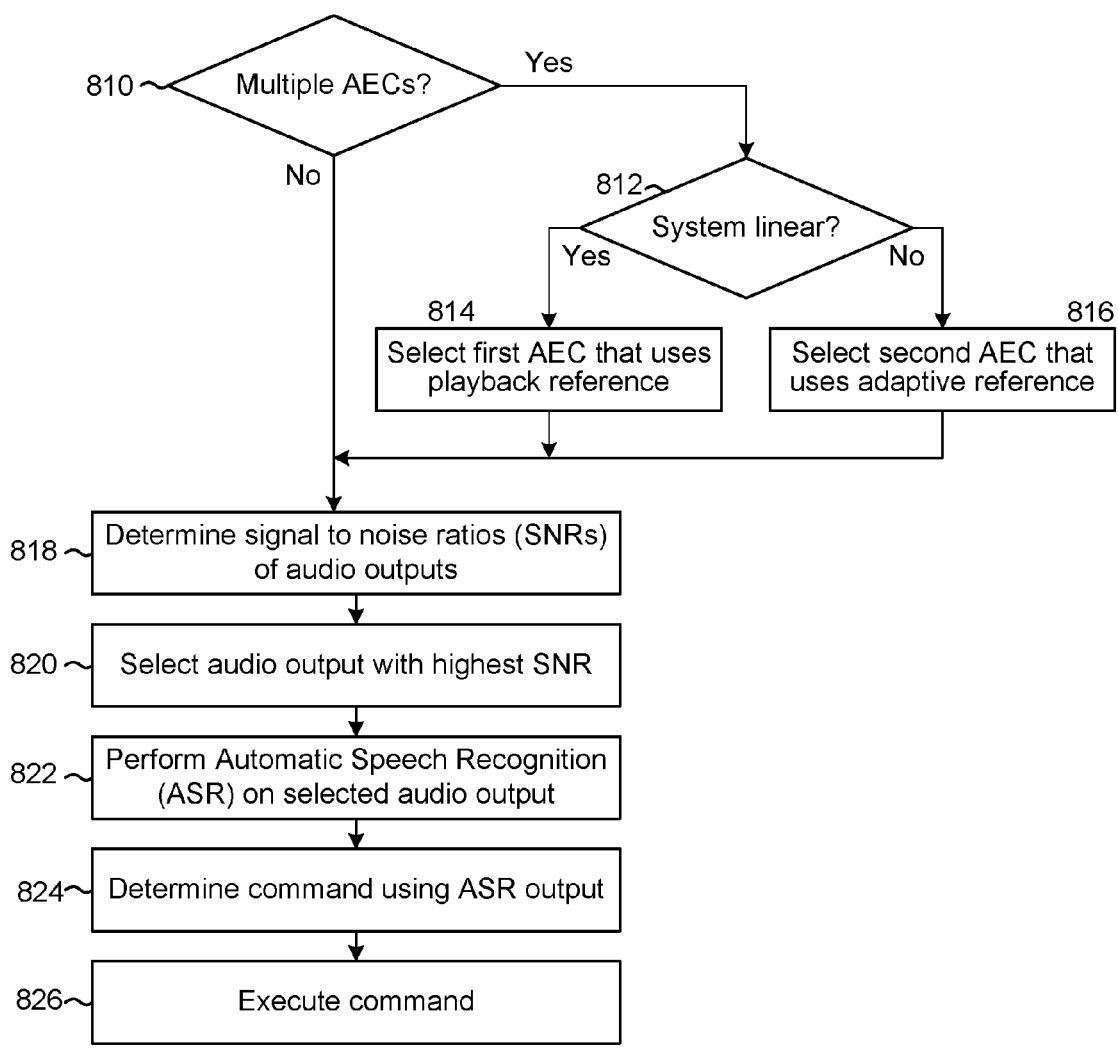
FIG. 8 is a flowchart conceptually illustrating an example method for selecting an output according to embodiments of the present disclosure.

FIG. 8 is a flowchart conceptually illustrating an example method for selecting an output according to embodiments of the present disclosure. As illustrated in FIG. 8, the device 102 may determine (810) that there are multiple Acoustic Echo Cancellation (AEC) circuits. If there are multiple AEC circuits, the device 102 may determine (812) if the system is linear, as discussed above with regard to FIG. 1C. If the system is linear, the device 102 may select (814) a first AEC associated with a playback reference. If the system is nonlinear, the device 102 may select (816) a second AEC associated with an adaptive reference. In some examples, the device 102 may omit steps 810-816 without departing from the present disclosure. For example, the device 102 may compare all of the audio outputs without regard to whether the system is linear and/or the AEC that generated an individual audio output. Instead, the device 102 may use a characteristic, parameter or the like to select one or more of the audio outputs.

After optionally performing steps 810-816, the device 102 may determine (818) signal to noise ratios (SNRs) associated with the audio outputs and select (820) an audio output having a highest SNR. However, a SNR is just a single example of a parameter or characteristic associated with the audio outputs and the present disclosure is not limited thereto. Instead of using SNRs, the device 102 may compare the audio outputs using other characteristics or parameters and may select the audio output having the best results based on the desired characteristics/parameters. The device 102 may perform (822) Automatic Speech Recognition (ASR) on the selected audio output, may determine (824) a command using the ASR output and may execute (826) the command. For example, the device 102 may determine that speech included in the selected audio output corresponds to a command to play music and the device 102 may play music in response to receiving the speech.

Thus, a media player that accepts voice commands via a microphone may perform AEC to remove reproduced sounds corresponding to output media that are captured by the microphone, making it easier to process input voice commands. Additionally or alternatively, if someone were singing karaoke into a microphone while prerecorded music is output by a loudspeaker, the device 102 may perform AEC to remove any of the recorded music from the audio captured by the microphone, allowing the singer's voice to be amplified and output without also reproducing a delayed "echo" the original music.

Figure 9:
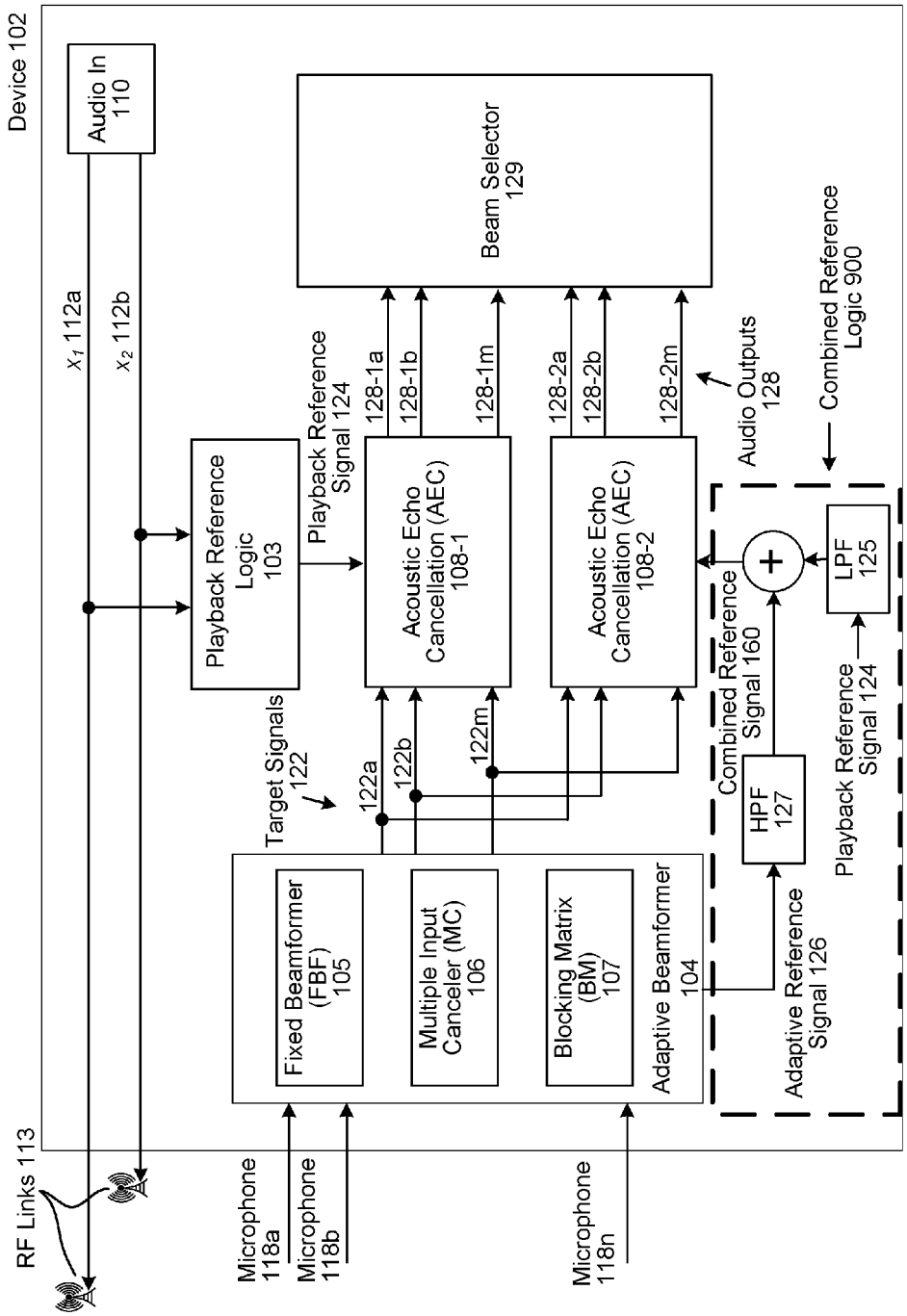
FIG. 9 illustrates an echo cancellation system having a combined reference signal according to embodiments of the present disclosure.

FIG. 9 illustrates an echo cancellation system having a combined reference signal according to embodiments of the present disclosure. The echo cancellation system illustrated in FIG. 9 is identical to the echo cancellation system illustrated in FIG. 1C, except that instead of the second AEC 108-2 receiving the adaptive reference signal 126 as illustrated in FIG. 1C, FIG. 9 illustrates the second AEC 108-2 receiving a combined reference signal 160 generated using combined reference logic 900. For example, a low pass filter (LPF) 125 may be applied to the playback reference signal 124 and a high pass filter (HPF) 127 may be applied to the adaptive reference signal 126, such that the combined reference signal 160 may include a combination of the low frequencies of the playback reference signal 124 and the high frequencies of the adaptive reference signal 126, as described in greater detail above with regard to FIG. 1D.

A first cutoff frequency between the LPF 125 and the HPF 127 may be fixed based on a parameter associated with the device 102. For example, the first cutoff frequency may be based on a distance between microphones 118 in the microphone array design. Therefore, the LPF 125 may pass frequencies below the first cutoff frequency and the HPF 127 may pass frequencies above the first cutoff frequency. In some examples, the HPF 127 may pass frequencies between the first cutoff frequency and a second cutoff frequency. For example, the second cutoff frequency may be based on a sampling frequency of the microphones 118 (e.g., half of the sampling frequency) and the HPF 127 may attenuate frequencies above the second cutoff frequency to reduce distortion.

In the echo cancellation system illustrated in FIG. 9, the second AEC 108-2 may receive the target signals 122 and the combined reference signal 160 and may remove the combined reference signal 160 from the target signals 122 to generate second audio outputs 128-2 (e.g., 128-2a, 128-2b, ... 128-2m) that are output to a beam selector 129.

As discussed above, a frequency offset and other nonlinear distortion between the originally transmitted audio (e.g., reference signals 112) and the microphone input (e.g., echo signals 120) affects higher frequencies differently than lower frequencies. For example, higher frequencies are rotated more significantly by the frequency offset relative to lower frequencies, complicating the task of removing the echo. Therefore, a conventional AEC system (e.g., using playback reference signal 124) may provide good performance for low frequencies while the ARSSA AEC system (e.g., using adaptive reference signal 126) may outperform the conventional AEC system for high frequencies. By combining the playback reference signal 124 and the adaptive reference signal 126, the device 102 may generate the second audio outputs 128-2 with improved performance for low frequencies (using the playback reference signal 124) and high frequencies (using the adaptive reference 126).

As discussed above with regard to FIG. 1C, the beam selector 129 may dynamically select from the first audio outputs 128-1 and the second audio outputs 128-2 based on changing conditions. For example, the conventional AEC system (e.g., first AEC 108-1) provides good performance when the system is linear (e.g., no distortion, fixed delay and/or low frequency offset between the reference signals 112 and the echo signals 120 input to the microphones 118), whereas the ARSSA AEC system (e.g., second AEC 108-2) outperforms the conventional AEC system when the system is nonlinear (e.g., there is distortion, variable delay and/or high frequency offset between the reference signals 112 and the echo signals 120 input to the microphones 118). Therefore, the beam selector 129 may decide between the first audio outputs 128-1 and the second audio outputs 128-2 based on a linearity of the system, as discussed above, to combine the benefits of the conventional AEC approach and the ARSSA AEC approach. In addition, the beam selector 129 may select one or more of the audio outputs 128 based on a signal to noise ratio (SNR) of the audio outputs 128.

Figure 10:
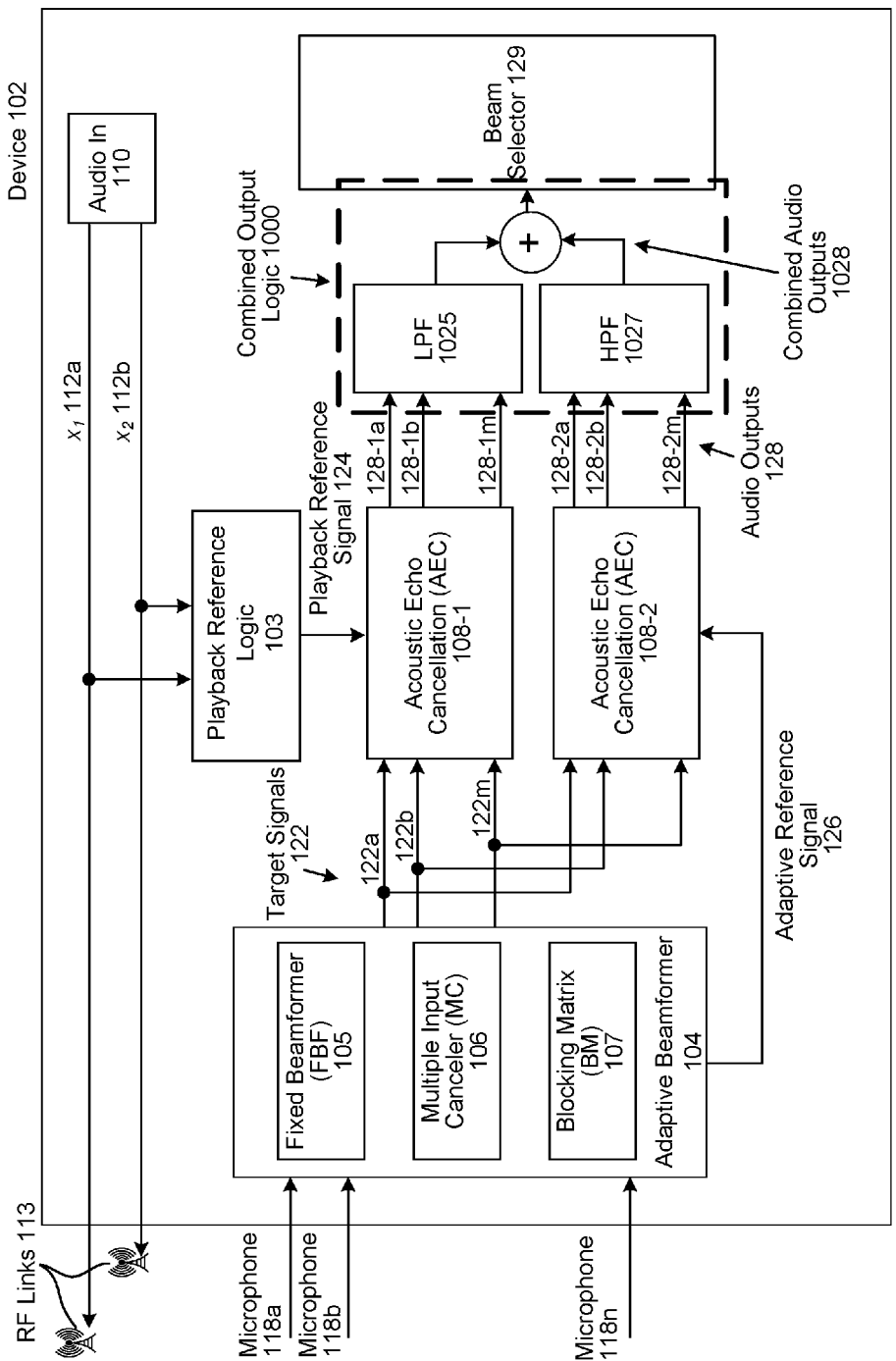
FIG. 10 illustrates an echo cancellation system that combines outputs of multiple echo cancellation circuits according to embodiments of the present disclosure.

FIG. 10 illustrates an echo cancellation system that combines outputs of multiple echo cancellation circuits according to embodiments of the present disclosure. The echo cancellation system illustrated in FIG. 10 is identical to the echo cancellation system illustrated in FIG. 1C, except that instead of a beam selector 129 receiving first audio outputs 128-1 and second audio outputs 128-2 as illustrated in FIG. 1C, FIG. 10 illustrates the beam selector 129 receiving combined audio outputs 1028 from combined output logic 1000. For example, a low pass filter (LPF) 1025 may be applied to the first audio outputs 128-1 and a high pass filter (HPF) 1027 may be applied to the second audio outputs 128-2, such that the combined audio outputs 1028 may include a combination of the low frequencies of the first audio outputs 128-1 and the high frequencies of the second audio outputs 128-2.

A first cutoff frequency between the LPF 1025 and the HPF 1027 may be fixed based on a parameter associated with the device 102. For example, the first cutoff frequency may be based on a distance between microphones 118 in the microphone array design. Therefore, the LPF 1025 may pass frequencies below the first cutoff frequency and the HPF 1027 may pass frequencies above the first cutoff frequency. In some examples, the HPF 1027 may pass frequencies between the first cutoff frequency and a second cutoff frequency. For example, the second cutoff frequency may be based on a sampling frequency of the microphones 118 (e.g., half of the sampling frequency) and the HPF 1027 may attenuate frequencies above the second cutoff frequency to reduce distortion.

As discussed above, a frequency offset and other nonlinear distortion between the originally transmitted audio (e.g., reference signals 112) and the microphone input (e.g., echo signals 120) affects higher frequencies differently than lower frequencies. For example, higher frequencies are rotated more significantly by the frequency offset relative to lower frequencies, complicating the task of removing the echo. Therefore, a conventional AEC system (e.g., using playback reference signal 124) may provide good performance for low frequencies while the ARSSA AEC system (e.g., using adaptive reference signal 126) may outperform the conventional AEC system for high frequencies. By combining the first audio outputs 128-1 and the second audio outputs 128-2, the device 102 may generate combined audio outputs 1028 with improved performance for low frequencies (using the playback reference signal 124) and high frequencies (using the adaptive reference 126).

The beam selector 129 may receive a plurality of combined audio inputs 1028 (e.g., 1028a, 1028b, ... 1028m) and may select one or more of the combined audio outputs 1028 based on a signal to noise ratio (SNR) of the combined audio outputs 1028. For example, the beam selector 129 may select a first combined audio output 1028a having a highest SNR of the combined audio outputs 1028, although the disclosure is not limited thereto.

Figure 11:
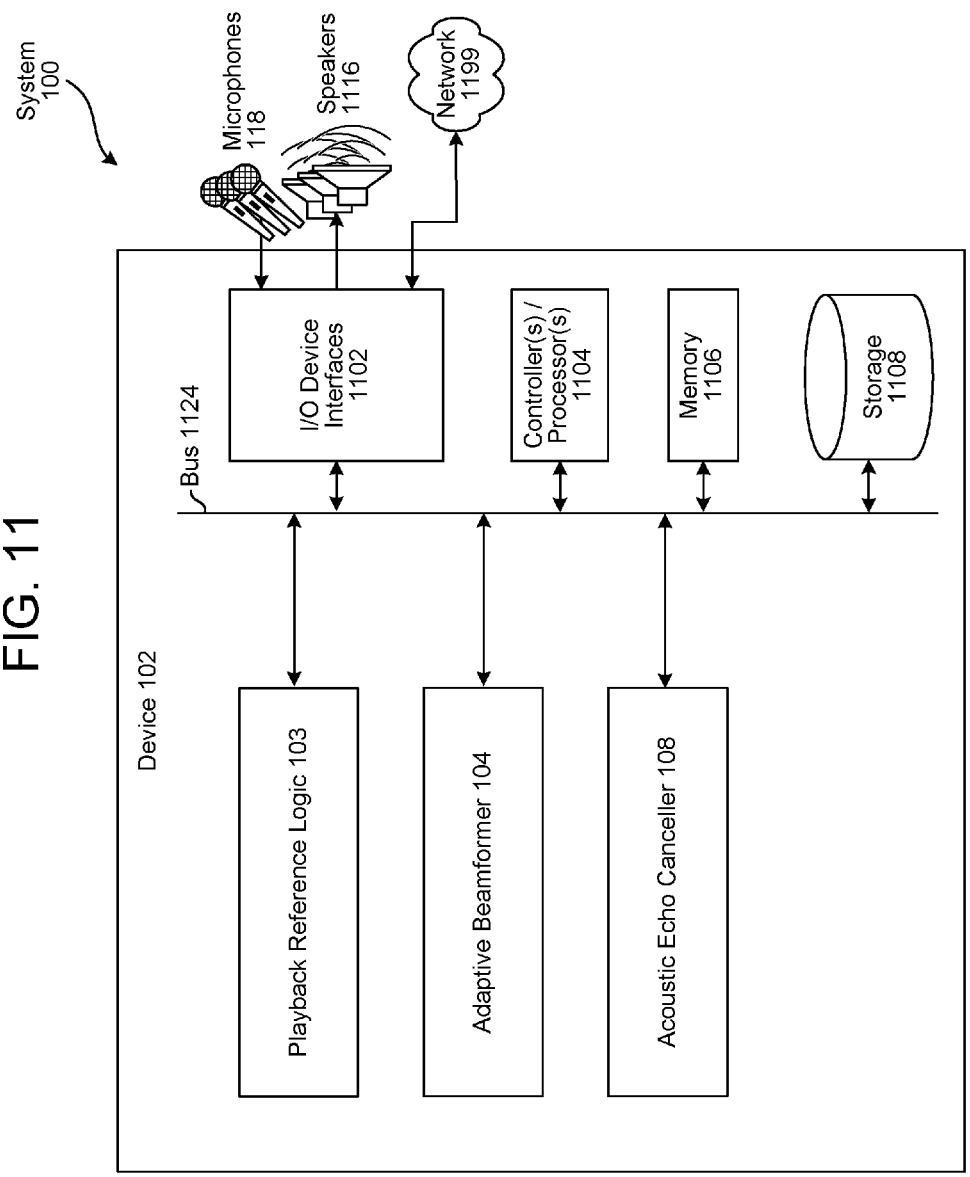
FIG. 11 is a block diagram conceptually illustrating example components of a system for echo cancellation according to embodiments of the present disclosure.

FIG. 11 is a block diagram conceptually illustrating example components of the system 100. In operation, the system 100 may include computer-readable and computer-executable instructions that reside on the device 102, as will be discussed further below.

The system 100 may include one or more audio capture device(s), such as a microphone 118 or an array of microphones 118. The audio capture device(s) may be integrated into the device 102 or may be separate.

The system 100 may also include an audio output device for producing sound, such as speaker(s) 1116. The audio output device may be integrated into the device 102 or may be separate.

The device 102 may include an address/data bus 1124 for conveying data among components of the device 102. Each component within the device 102 may also be directly connected to other components in addition to (or instead of) being connected to other components across the bus 1124.

The device 102 may include one or more controllers/processors 1104, that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The device 102 may also include a data storage component 1108, for storing data and controller/processor-executable instructions (e.g., instructions to perform the algorithms illustrated in FIGS. 1A, 1B, 6, 7 and/or 8). The data storage component 1108 may include one or more non-volatile storage types such as magnetic storage, optical storage, solid-state storage, etc. The device 102 may also be connected to removable or external non-volatile memory and/or storage (such as a removable memory card, memory key drive, networked storage, etc.) through the input/output device interfaces 1102.

Computer instructions for operating the device 102 and its various components may be executed by the controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The device 102 includes input/output device interfaces 1102. A variety of components may be connected through the input/output device interfaces 1102, such as the speaker(s) 1116, the microphones 118, and a media source such as a digital media player (not illustrated). The input/output interfaces 1102 may include A/D converters for converting the output of microphone 118 into echo signals y 120, if the microphones 118 are integrated with or hardwired directly to device 102. If the microphones 118 are independent, the A/D converters will be included with the microphones, and may be clocked independent of the clocking of the device 102. Likewise, the input/output interfaces 1102 may include D/A converters for converting the reference signals x 112 into an analog current to drive the speakers 114, if the speakers 114 are integrated with or hardwired to the device 102. However, if the speakers are independent, the D/A converters will be included with the speakers, and may be clocked independent of the clocking of the device 102 (e.g., conventional Bluetooth speakers).

The input/output device interfaces 1102 may also include an interface for an external peripheral device connection such as universal serial bus (USB), FireWire, Thunderbolt or other connection protocol. The input/output device interfaces 1102 may also include a connection to one or more networks 1199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1199, the system 100 may be distributed across a networked environment.

The device 102 further includes playback reference logic 103, an adaptive beamformer 104, which includes a fixed beamformer (FBF) 105, a multiple input canceler (MC) 106 and a blocking matrix (BM) 107, and an acoustic echo cancellation (AEC) 108.

Multiple devices 102 may be employed in a single system 100. In such a multi-device system, each of the devices 102 may include different components for performing different aspects of the AEC process. The multiple devices may include overlapping components. The components of device 102 as illustrated in FIG. 11 is exemplary, and may be a stand-alone device or may be included, in whole or in part, as a component of a larger device or system. For example, in certain system configurations, one device may transmit and receive the audio data, another device may perform AEC, and yet another device my use the audio outputs 128 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the Acoustic Echo Canceller 108 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for cancelling an echo from an audio signal to isolate received speech, the method comprising:
sending first playback audio data to a first wireless speaker;
receiving first input audio data from a first microphone of a microphone array, the first input audio data including a first representation of audible sound output by the first wireless speaker and speech input;
receiving second input audio data from a second microphone of the microphone array, the second input audio data including a second representation of the audible sound output by the first wireless speaker and the speech input;
determining a first portion of combined input audio data, the combined input audio data comprising at least the first input audio data and the second input audio data, the first portion of the combined input audio data comprising a first portion of the first input audio data corresponding to a first direction and a first portion of the second input audio data corresponding to the first direction;
determining a second portion of the combined input audio data, the second portion of the combined input audio data comprising a second portion of the first input audio data corresponding to a second direction and a second portion of the second input audio data corresponding to the second direction;
selecting at least the first portion of the combined input audio data as a target signal on which to perform echo cancellation;
blocking high frequencies of the first playback audio data using a low pass filter to generate a first reference signal, the first reference signal including the first playback audio data below a first cutoff frequency;

blocking low frequencies of the second portion of the combined input audio data using a high pass filter to generate a second reference signal, the second reference signal including the second portion of the combined input audio data above the first cutoff frequency;

generating an input reference signal by combining the first reference signal and the second reference signal;

removing the input reference signal from the target signal to generate a first output audio signal that includes the speech input;

performing speech recognition processing on the first output audio signal to determine a command; and executing the command.

2. The computer-implemented method of claim 1, further comprising:

determining a propagation delay of the first input audio data relative to the first playback audio data;

generating second playback audio data by delaying the first playback audio data by the propagation delay;

determining a frequency offset between the second playback audio data and the first input audio data;

generating third playback audio data using the second playback audio data by one of:

removing at least one sample of the second playback audio data per cycle to compensate for the frequency offset, or adding a duplicate copy of at least one sample of the second playback audio data to the second playback audio data to compensate for the frequency offset;

blocking high frequencies of the third playback audio data using the low pass filter to generate the first reference signal, the first reference signal including the third playback audio data below the first cutoff frequency.

3. The computer-implemented method of claim 1, further comprising:

determining that the second portion of the combined input audio data corresponds to a highest amplitude representation of the audible sound output of a plurality of portions of the combined input audio data;

determining that an amplitude of the second portion of the combined input audio data is above a threshold;

associating the second portion of the combined input audio data with the first wireless speaker by selecting the second portion as the second reference signal; and selecting remaining portions of the plurality of portions as the target signal.

4. The computer-implemented method of claim 1, further comprising:

determining, using a fixed beamforming technique, the first and the second portions of the combined input audio data;

determining that a first amplitude associated with the first portion of the combined input audio data is below a threshold;

determining that a second amplitude associated with the second portion of the combined input audio data is above the threshold;

determining, using an adaptive beamforming technique, a third portion of the combined input audio data, the third portion of the combined input audio data comprising a third portion of the first input audio data corresponding to the second direction and a third portion of the second input audio data corresponding to the second direction; and blocking low frequencies of the third portion of the combined input audio data using the high pass filter to generate the second reference signal, the second reference signal including the third portion of the combined input audio data above the first cutoff frequency.

5. A computer-implemented method, comprising:

sending first playback audio data to a first wireless speaker;

receiving first input audio data from a first microphone of a microphone array, the first input audio data including a first representation of sound output by the first wireless speaker and speech input;

receiving second input audio data from a second microphone of the microphone array, the second input audio data including a second representation of the audible sound output by the first wireless speaker and the speech input;

determining a first portion of combined input audio data, the combined input audio data comprising at least the first input audio data and the second input audio data, the first portion of the combined input audio data comprising a first portion of the first input audio data corresponding to a first direction and a first portion of the second input audio data corresponding to the first direction;

determining a second portion of the combined input audio data, the second portion of the combined input audio data comprising a second portion of the first input audio data corresponding to a second direction and a second portion of the second input audio data corresponding to the second direction;

generating first reference data based on the first playback audio data, the first reference data having frequencies below a first cutoff frequency;

generating second reference data based on the second portion of the combined input audio data, the second reference data having frequencies above the first cutoff frequency; and generating a reference signal by combining the first reference data and the second reference data.

6. The computer-implemented method of claim 5, further comprising:

selecting at least the first portion of the combined input audio data as a first target signal;

removing the reference signal from the first target signal to generate first output audio data that includes the speech input;

selecting at least a third portion of the combined input audio data as a second target signal;

removing the reference signal from the second target signal to generate second output audio data that includes the speech input;

determining a first signal to noise ratio associated with the first output audio data;

determining a second signal to noise ratio associated with the second output audio data;

determining that the first signal to noise ratio is larger than the second signal to noise ratio;

performing speech recognition processing on the first output audio data to determine a command; and executing the command.

7. The computer-implemented method of claim 5, further comprising:

determining a propagation delay of the first input audio data relative to the first playback audio data;

generating second playback audio data by delaying the first playback audio data by the propagation delay;

determining a frequency offset between the second playback audio data and the first input audio data;

generating third playback audio data by one of:
   removing at least one sample of the second playback audio data per cycle based on the frequency offset, and
   adding a duplicate copy of at least one sample of the second playback audio data to the second playback audio data based on the frequency offset;
blocking high frequencies of the third playback audio data using a low pass filter to generate the first reference data, the first reference data including the third playback audio data below the first cutoff frequency.

8. The computer-implemented method of claim 5, further comprising:
   determining that the second portion of the combined input audio data corresponds to a highest amplitude of a plurality of portions of the combined input audio data;
   determining that an amplitude of the second portion of the combined input audio data is above a threshold; and
   associating the second portion of the combined input audio data with the first wireless speaker.

9. The computer-implemented method of claim 5, further comprising:
   determining that an amplitude associated with the second portion of the combined input audio data is above a threshold;
   determining that a highest amplitude associated with remaining portions of a plurality of portions of the combined input audio data is below the threshold;
   generating the second reference data based on at least the second portion of the combined input audio data;
   selecting at least the first portion of the combined input audio data as a target signal; and
   removing the reference signal from the target signal to generate first output audio data that includes the speech input.

10. The computer-implemented method of claim 5, further comprising:
   determining that the speech input is associated with the first direction; selecting at least the first portion of the combined input audio data as a target signal;
   determining that the second direction is opposite the first direction;
   generating the second reference data based on at least the second portion of the combined input audio data; and
   removing the reference signal from the target signal to generate first output audio data that includes the speech input.

11. The computer-implemented method of claim 5, further comprising:
   determining that the second portion of the combined input audio data corresponds to a highest amplitude of a plurality of portions;
   determining that an amplitude of the second portion of the combined input audio data is below a threshold;
   selecting the first portion of the combined input audio data as a first target signal;
   determining that the second direction is opposite the first direction;
   generating the second reference data based on the second portion of the combined input audio data;
   removing the reference signal from the first target signal to generate first output audio data that includes the speech input;
   selecting the second portion of the combined input audio data as a second target signal;
   generating third reference data based on the first portion of the combined input audio data, the third reference data having frequencies above the first cutoff frequency;
   generating a second reference signal by combining the first reference data and the third reference data; and
   removing the second reference signal from the second target signal to generate second output audio data that includes the speech input.

12. The computer-implemented method of claim 5, further comprising:
   determining, using a fixed beamforming technique, the first and the second portions of the combined input audio data;
   determining that a first amplitude associated with the first portion of the combined input audio data is below a threshold;
   determining that a second amplitude associated with the second portion of the combined input audio data is above the threshold;
   determining, using an adaptive beamforming technique, a third portion of the combined input audio data, the third portion of the combined input audio data comprising a third portion of the first input audio data corresponding to the second direction and a third portion of the second input audio data corresponding to the second direction;
   blocking low frequencies of the third portion of the combined input audio data using a high pass filter to generate the second reference data, the second reference data including the third portion of the combined input audio data above the first cutoff frequency.

13. A device, comprising:
   at least one processor;
   a memory device including instructions operable to be executed by the at least one processor to configure the device to:
      send first playback audio data to a first wireless speaker;
      receive first input audio data from a first microphone of a microphone array, the first input audio data including a first representation of sound output by the first wireless speaker and speech input;
      receive second input audio data from a second microphone of the microphone array, the second input audio data including a second representation of the audible sound output by the first wireless speaker and the speech input;
      determine a first portion of combined input audio data, the combined input audio data comprising at least the first input audio data and the second input audio data, the first portion of the combined input audio data comprising a first portion of the first input audio data corresponding to a first direction and a first portion of the second input audio data corresponding to the first direction;
      determine a second portion of the combined input audio data, the second portion of the combined input audio data comprising a second portion of the first input audio data corresponding to a second direction and a second portion of the second input audio data corresponding to the second direction;
      generate first reference data based on the first playback audio data, the first reference data having frequencies below a first cutoff frequency;

generate second reference data based on the second portion of the combined input audio data, the second reference data having frequencies above the first cutoff frequency; and generate a reference signal by combining the first reference data and the second reference data.

14. The device of claim 13, wherein the instructions further configure the device to:

select at least the first portion of the combined input audio data as a first target signal;

remove the reference signal from the first target signal to generate first output audio data that includes the speech input;

select at least a third portion of the combined input audio data as a second target signal;

remove the reference signal from the second target signal to generate second output audio data that includes the speech input;

determine a first signal to noise ratio associated with the first output audio data;

determine a second signal to noise ratio associated with the second output audio data;

determine that the first signal to noise ratio is larger than the second signal to noise ratio;

perform speech recognition processing on the first output audio data to determine a command; and execute the command.

15. The device of claim 13, wherein the instructions further configure the device to:

determine a propagation delay of the first input audio data relative to the first playback audio data;

generate second playback audio data by delaying the first playback audio data by the propagation delay;

determine a frequency offset between the second playback audio data and the first input audio data;

generate third playback audio data by one of:
removing at least one sample of the second playback audio data per cycle based on the frequency offset, and
adding a duplicate copy of at least one sample of the second playback audio data to the second playback audio data based on the frequency offset;

blocking high frequencies of the third playback audio data using a low pass filter to generate the first reference data, the first reference data including the third playback audio data below the first cutoff frequency.

16. The device of claim 13, wherein the instructions further configure the device to:

determine that the second portion of the combined input audio data corresponds to a highest amplitude of a plurality of portions of the combined input audio data;

determine that an amplitude of the second portion of the combined input audio data is above a threshold; and associate the second portion of the combined input audio data with the first wireless speaker.

17. The device of claim 13, wherein the instructions further configure the device to:

determine that an amplitude associated with the second portion of the combined input audio data is above a threshold;

determine that a highest amplitude associated with remaining portions of a plurality of portions of the combined input audio data is below the threshold;

generate the second reference data based on at least the second portion of the combined input audio data;

select at least the first portion of the combined input audio data as a target signal; and remove the reference signal from the target signal to generate first output audio data that includes the speech input.

18. The device of claim 13, wherein the instructions further configure the device to:

determine that the speech input is associated with the first direction; select at least the first portion of the combined input audio data as a target signal;

determine that the second direction is opposite the first direction;

generate the second reference data based on at least the second portion of the combined input audio data; and remove the reference signal from the target signal to generate first output audio data that includes the speech input.

19. The device of claim 13, wherein the instructions further configure the device to:

determine that the second portion of the combined input audio data corresponds to a highest amplitude of a plurality of portions;

determine that an amplitude of the second portion of the combined input audio data is below a threshold;

select the first portion of the combined input audio data as a first target signal;

determine that the second direction is opposite the first direction;

generate the second reference data based on the second portion of the combined input audio data;

remove the reference signal from the first target signal to generate first output audio data that includes the speech input;

select the second portion of the combined input audio data as a second target signal;

generate third reference data based on the first portion of the combined input audio data, the third reference data having frequencies above the first cutoff frequency;

generate a second reference signal by combining the first reference data and the third reference data; and remove the second reference signal from the second target signal to generate second output audio data that includes the speech input.

20. The device of claim 13, wherein the instructions further configure the device to:

determine, using a fixed beamforming technique, the first and the second portions of the combined input audio data;

determine that a first amplitude associated with the first portion of the combined input audio data is below a threshold;

determine that a second amplitude associated with the second portion of the combined input audio data is above the threshold;

determine, using an adaptive beamforming technique, a third portion of the combined input audio data, the third portion of the combined input audio data comprising a third portion of the first input audio data corresponding to the second direction and a third portion of the second input audio data corresponding to the second direction;

blocking low frequencies of the third portion of the combined input audio data using a high pass filter to generate the second reference data, the second reference data including the third portion of the combined input audio data above the first cutoff frequency.

* * * * *